(12) United States Patent
Halladay et al.

(10) Patent No.: US 9,506,500 B2
(45) Date of Patent: *Nov. 29, 2016

(54) WEAR-INDICATING BEARING AND METHOD

(71) Applicant: LORD CORPORATION, Cary, NC (US)

(72) Inventors: James R. Halladay, Erie, PA (US); Patrick M. Sheridan, North East, PA (US); Marshall W. Downing, Erie, PA (US); Zach Fuhrer, Erie, PA (US)

(73) Assignee: LORD Corporation, Cary, NC (US)

( * ) Notice: Subject to any disclaimer, the term of this patent is extended or adjusted under 35 U.S.C. 154(b) by 88 days.

This patent is subject to a terminal disclaimer.

(21) Appl. No.: 14/085,187

(22) Filed: Nov. 20, 2013

(65) Prior Publication Data

US 2014/0169710 A1 Jun. 19, 2014

Related U.S. Application Data

(63) Continuation of application No. 12/927,754, filed on Nov. 23, 2010, now Pat. No. 9,068,621.

(60) Provisional application No. 61/263,799, filed on Nov. 23, 2009.

(51) Int. Cl.
*F16F 7/00* (2006.01)
*F16C 41/00* (2006.01)
(Continued)

(52) U.S. Cl.
CPC ............. *F16C 41/008* (2013.01); *B64C 27/35* (2013.01); *F16C 33/04* (2013.01); *F16F 1/406* (2013.01)

(58) Field of Classification Search
CPC .......... F16F 1/406; F16F 1/3842; F16F 1/40; F16F 1/403; F16F 1/3605; F16C 33/04; F16C 41/008; F16C 27/063; F16C 11/0609; B64C 27/35

USPC ........ 267/141.1, 140.2, 140.4, 294; 384/221, 384/222; 416/134 A, 134 R, 140; 464/69, 464/70, 71, 72, 90
See application file for complete search history.

(56) References Cited

U.S. PATENT DOCUMENTS 3,134,445 A * 5/1964 Hotchkiss ............. B64C 27/007
116/266
3,258,805 A * 7/1966 Rossnan ................ A46B 15/00
116/200

(Continued)

FOREIGN PATENT DOCUMENTS

EP 1 579 985 9/2005
GB 2 347 393 9/2000

(Continued)

OTHER PUBLICATIONS

Randolph Research, Lamiflex Hi-Load Rubber Laminate Bearings/Seals, www.randolphresearch.com; Nov. 10, 2009, 2 pgs.

(Continued)

*Primary Examiner* — Pamela Rodriguez

(57) ABSTRACT

A wear-indicating bearing and method of detecting wear in a bearing are disclosed. The bearing includes a bearing stack having a first end and a second end with a longitudinal axis defined between the first and second ends. The bearing stack includes a plurality of elastomeric layers sandwiched between non-elastomeric shim layers, where each layer is concentric about the longitudinal axis. At least one elastomeric layer is a marker layer configured to indicate wear of the bearing. The marker layer is made up of a first elastomeric composition and a second elastomeric composition, wherein the first and second elastomeric compositions have optically different characteristics. Upon fatigue of the bearing, the first elastomeric composition is detectable through a fracture extending from an exterior surface of the bearing stack.

26 Claims, 20 Drawing Sheets

(51) Int. Cl.
B64C 27/35 (2006.01)
F16F 1/40 (2006.01)
F16C 33/04 (2006.01)

(56) References Cited

U.S. PATENT DOCUMENTS

| | | | | |
|---|---|---|---|---|
| 3,578,055 A * | 5/1971 | French | B60C 11/24 | 116/208 |
| 3,759,631 A * | 9/1973 | Rybicki | B64C 27/32 | 416/134 A |
| 3,778,189 A * | 12/1973 | Ferris | B64C 27/35 | 416/134 A |
| 3,787,102 A * | 1/1974 | Moran | F16F 1/38 | 267/282 |
| 3,814,160 A * | 6/1974 | Creasey | B60C 11/24 | 152/154.2 |
| 3,941,433 A * | 3/1976 | Dolling | F16F 1/3935 | 267/152 |
| 4,105,266 A * | 8/1978 | Finney | F16F 1/403 | 267/152 |
| 4,142,833 A * | 3/1979 | Rybicki | B64C 27/48 | 384/221 |
| 4,244,677 A * | 1/1981 | Noehren | B64C 27/33 | 416/134 A |
| 4,251,187 A * | 2/1981 | Hollrock | B64C 27/35 | 403/226 |
| 4,256,354 A * | 3/1981 | Peterson | F16F 1/3935 | 384/2 |
| 4,297,078 A * | 10/1981 | Martin | B64C 27/35 | 416/134 A |
| 4,357,057 A * | 11/1982 | Peterson | B64C 27/35 | 384/125 |
| 4,365,936 A * | 12/1982 | Hatch | B64C 27/35 | 416/134 A |
| 4,373,862 A * | 2/1983 | Ferris | B64C 27/006 | 116/264 |
| 4,439,106 A * | 3/1984 | Ferris | B64C 27/48 | 416/134 A |
| 4,836,029 A * | 6/1989 | Skala | G01N 3/24 | 73/799 |
| 4,927,481 A * | 5/1990 | McGregor | B29C 43/203 | 156/245 |
| 5,186,686 A * | 2/1993 | Staples | B64C 27/35 | 464/69 |
| 5,188,513 A * | 2/1993 | Byrnes | F16F 3/093 | 267/140.4 |
| 5,213,739 A * | 5/1993 | Dickerson | B29C 45/14311 | 156/245 |
| 5,303,756 A * | 4/1994 | Hill | B60C 11/24 | 152/154.2 |
| 5,399,309 A * | 3/1995 | Simmons | F02K 9/84 | 264/257 |
| 5,817,365 A * | 10/1998 | Richardson | B29C 41/14 | 2/167 |
| 5,894,682 A * | 4/1999 | Broz | A43B 13/12 | 36/1 |
| 6,023,967 A * | 2/2000 | Chung | G01M 17/027 | 73/146 |
| 6,848,886 B2 * | 2/2005 | Schmaling | B64C 27/35 | 416/134 A |
| 6,922,916 B1 * | 8/2005 | Potter | A43B 1/0027 | 36/1 |
| 7,290,985 B2 * | 11/2007 | James | B64C 27/56 | 416/1 |
| 7,565,778 B2 * | 7/2009 | Azeau | B64C 1/062 | 52/309.15 |
| 7,896,747 B2 * | 3/2011 | Russell | F16C 7/04 | 464/70 |
| 8,205,560 B2 * | 6/2012 | East | B61F 5/305 | 105/218.1 |
| 8,632,062 B2 * | 1/2014 | James | B64C 27/35 | 267/140.2 |
| 9,085,357 B2 | 7/2015 | Davis et al. | | |
| 2004/0208745 A1 * | 10/2004 | Schmaling | B64C 27/35 | 416/134 A |
| 2005/0248191 A1 * | 11/2005 | Azeau | B64C 1/062 | 297/216.1 |
| 2007/0231140 A1 * | 10/2007 | James | B64C 27/56 | 416/134 A |
| 2008/0023586 A1 * | 1/2008 | Russell | F16C 7/04 | 244/131 |
| 2010/0199880 A1 * | 8/2010 | East | B61F 5/305 | 105/224.1 |
| 2013/0121828 A1 * | 5/2013 | Davis | B64C 27/35 | 416/134 A |

FOREIGN PATENT DOCUMENTS

WO WO-79/00033 A1 * 1/1979
WO WO-00/17047 A1 * 3/2000

OTHER PUBLICATIONS

Randolph Research, Lamiflex Bearings for Helicopter Blade Retention, www.randolphresearch.com; Nov. 10, 2009, 4 pgs.
Department of the Navy, Technical Manual Aviation Unit and Intermediate Maintenance for Army UH60A and EH-60A Helicopters, TM55-1520-237-23, Aug. 29, 1989, 3 pgs.
Stevenson, A., Fatigue Crack Growth in High Load Capacity Rubber Laminates, Rubber Chemistry and Technology, vol. 59, 1985, pp. 208-222.

* cited by examiner

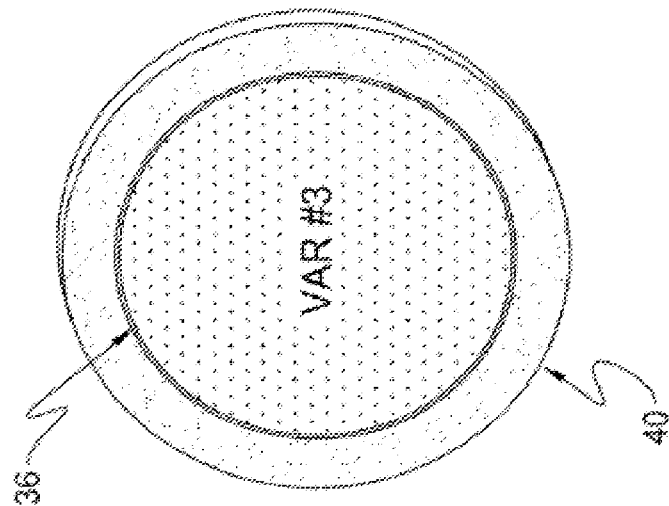
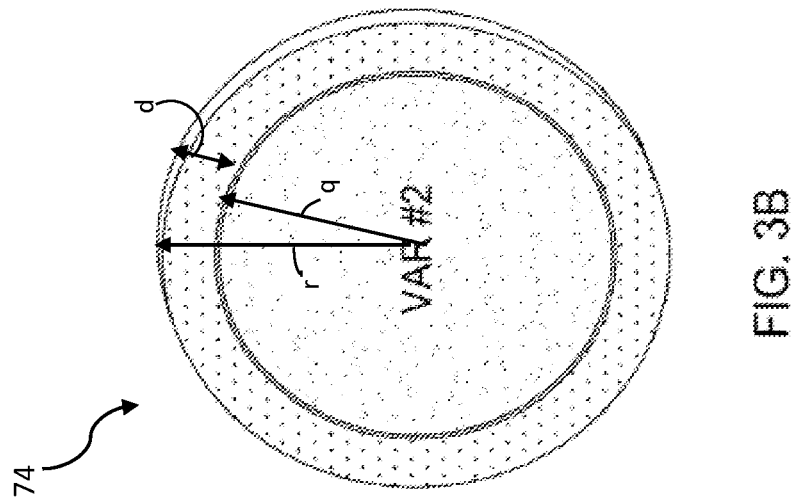
FIG. 3B
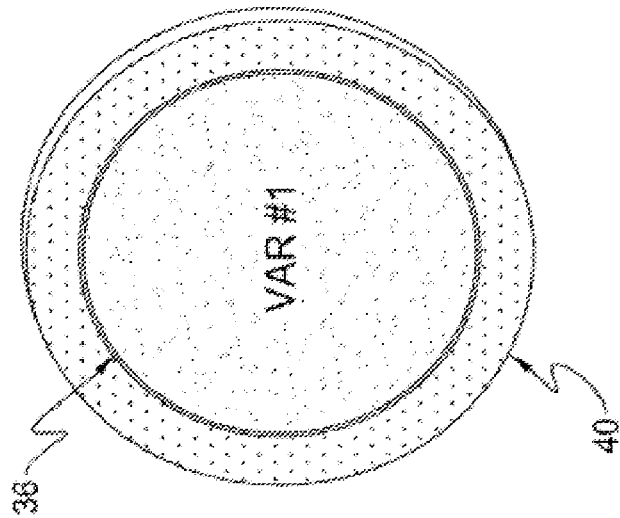

600K CYCLES

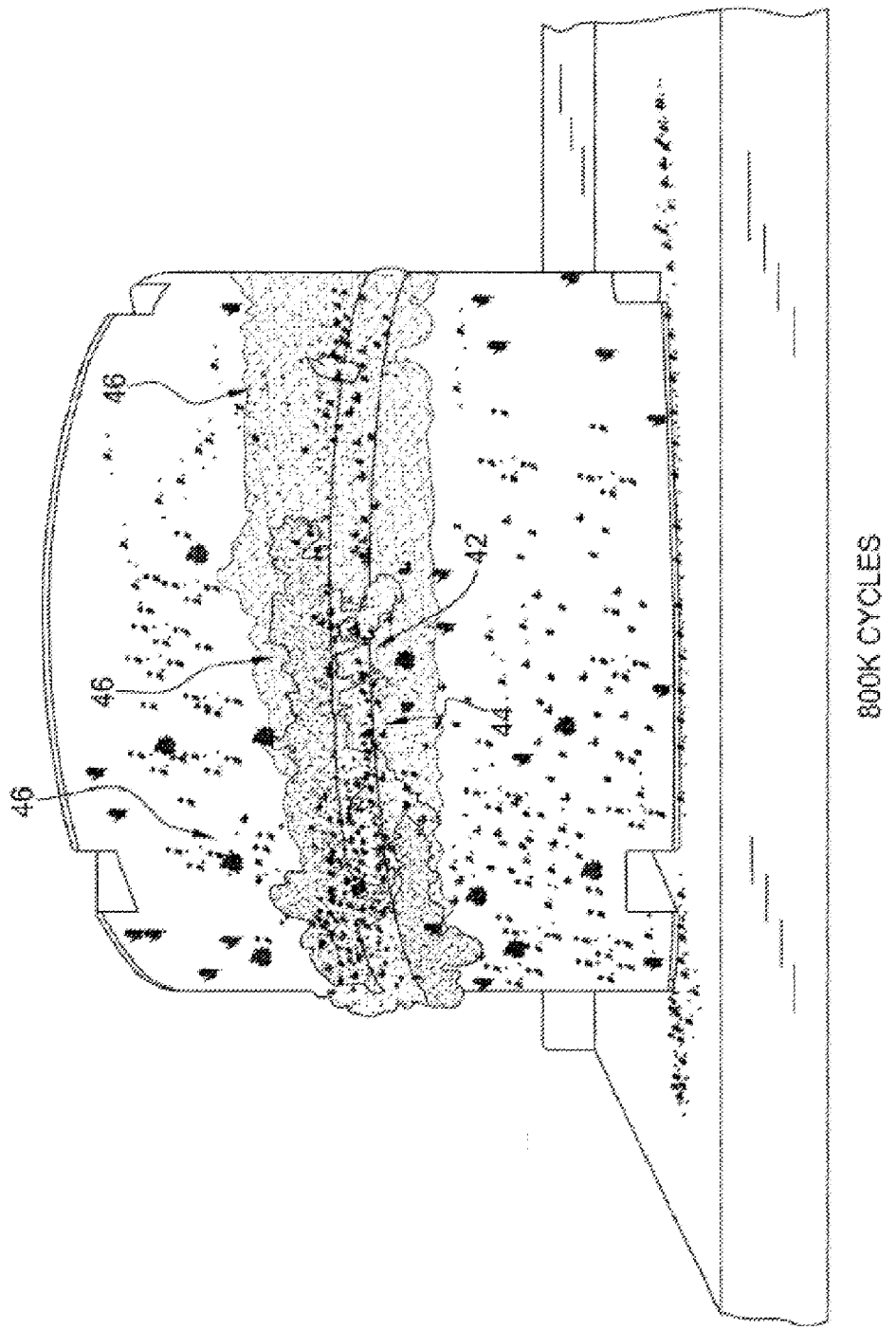

US 9,506,500 B2

WEAR-INDICATING BEARING AND METHOD

RELATED APPLICATIONS

This application is a continuation of non-provisional application having U.S. Ser. No. 12/927,754, filed on Nov. 23, 2010 (A ROTARY WING AIRCRAFT BEARING FOR ROTARY WING AIRCRAFT MOTIONS) which claims the benefit of U.S. Provisional Application No. 61/263,799, filed on Nov. 23, 2009 (A ROTARY WING AIRCRAFT BEARING FOR ROTARY WING AIRCRAFT MOTIONS), both of which are herein incorporated by reference in their entireties.

FIELD OF INVENTION/BACKGROUND

An elastomeric high-capacity laminate (HCL) wear-indicating bearing that provides constrained relative motion between a first member and a second member is configured to provide an optical indication of fatigue of the bearing.

SUMMARY OF THE INVENTION

In one embodiment, a wear-indicating bearing is provided. The wear-indicating bearing comprises: a bearing stack having a first end and a second end with a longitudinal axis defined between the first and second ends. The bearing stack includes a plurality of elastomeric layers sandwiched between non-elastomeric shim layers, where each layer is concentric about the longitudinal axis. At least one elastomeric layer is a marker layer configured to indicate wear of the bearing. Marker layer is made up of a first elastomeric composition and a second elastomeric composition, wherein the first and second elastomeric compositions have optically different characteristics.

In another embodiment, a bearing having a fatigue-indication therein is disclosed. The bearing includes a bearing stack having a first end and a second end with a longitudinal axis defined between the first and second ends. Bearing stack includes a plurality of elastomeric layers sandwiched between non-elastomeric shim layers, and each layer is concentric about the longitudinal axis. At least one elastomeric layer is a marker layer configured to indicate fatigue of the bearing. The marker layer includes a first inner material having a first optical characteristic ingredient and an outer material, coplanar with and surrounding the first inner material. The outer material has a second optical characteristic ingredient. The first and second optical characteristic ingredients are different. The first inner material is detectable when said bearing is fatigued.

A method for detecting fatigue in a wear-indicating bearing is disclosed. The bearing provides constrained relative motion between a first and second member, the method comprising: detecting fatigue of a bearing. The bearing includes a bearing stack having a first end and a second end with a longitudinal axis defined between the first and second ends. The bearing stack also includes a plurality of alternating elastomeric layers and non-elastomeric shim layers, wherein each layer is concentric about the longitudinal axis. At least one elastomeric layer is a marker layer configured to indicate fatigue of the bearing. The marker layer is made up of a first elastomeric composition and a second elastomeric composition, wherein said first and second elastomeric compositions have optically different characteristics. The first elastomeric composition defines an interior elastomeric region and the second elastomeric composition defines an exterior elastomeric region surrounding the interior elastomeric region. Upon fatigue of the bearing, the first elastomeric composition is detectable.

BRIEF DESCRIPTION OF THE DRAWINGS

FIGS. 3A-3B illustrate interior and exterior elastomeric regions with the interior elastomeric composition having at least a first interior optical characteristic different than the exterior elastomeric composition, with the elastomeric region materials shown before they are bonded and cured into a marker layer.

FIGS. 5A-5B and 6 depict the results of fatigue tests illustrating optically distinguishable elastomeric crumbs expelled from the bearing's interior elastomeric region and persisting on the exterior surface of the bearing.

DETAILED DESCRIPTION

The wear-indicating bearing described herein provides an indication of fatigue of the bearing to an inspector. As a result, the inspector does not need to be in physical contact with the bearing nor does the bearing need to be removed for fatigue testing. The bearing includes a plurality of alternating elastomeric and non-elastomeric layers. At least one elastomeric layer is a marker layer made up of at least two dissimilar elastomeric compositions. The dissimilar elastomeric compositions can be compositionally different and/or visually or optically different. As used herein visually or optically dissimilar (or visually/optically different, or visually/optically distinct, and variations thereof) are used interchangeably. Visual or optical properties may be in varying wavelengths of the electromagnetic spectrum such as the visible light spectrum or ultra-violet spectrum. Visually or optically different may include differences in color due to colorants or dyes; differences in appearance due to exposure to varying electromagnetic wavelengths such as visible light or ultra-violet light; or differences in the environment in which the bearing is positioned, e.g. a water soluble dye wherein upon exposure to a water-like fluid, a change in color in the surrounding fluid is produced and observed.

Figure 1B:
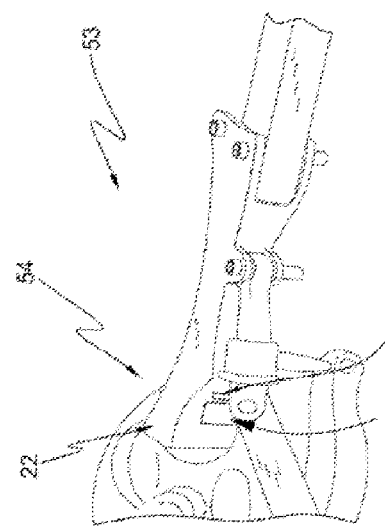
FIGS. 1A and 1B depict a rotary wing aircraft and a detailed view of placement of a wear-indicating bearing in the rotary wing aircraft.
Figure 1D:
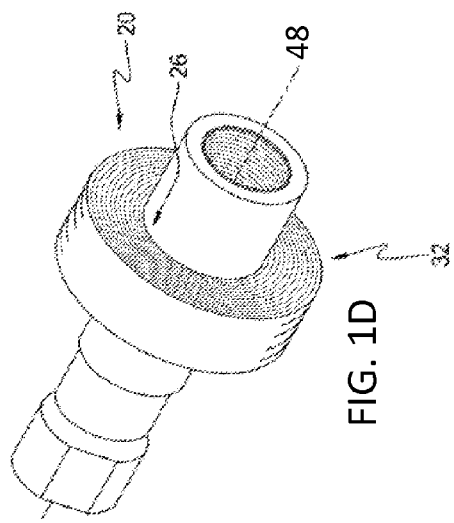
FIGS. 1C and 1D depict two embodiments of a wear-indicating bearing suitable for use in a rotary wing aircraft.
Figure 1A:
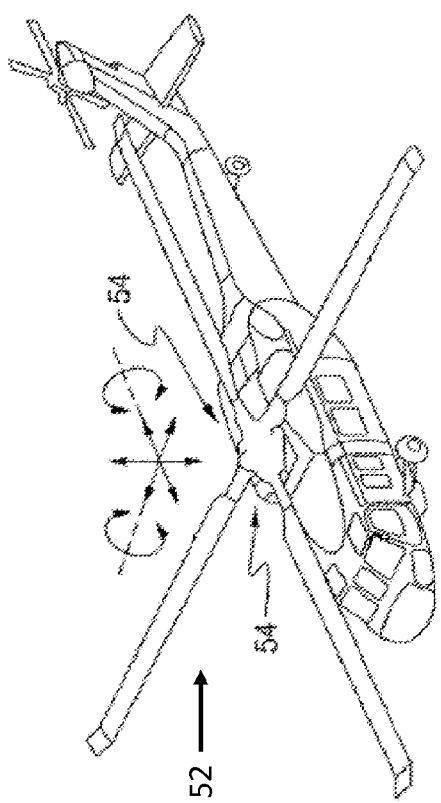
Figure 1C:
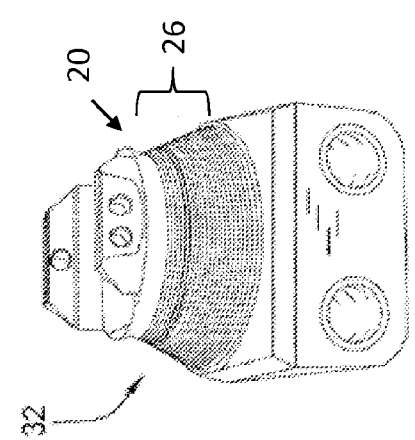

FIGS. 1A-1B depict a rotary wing aircraft 52 and a detailed view of bearing location 54 of a wear-indicating bearing 20 in the rotary wing system 53 of the aircraft 52. FIG. 1C depicts a spherical wear-indicating bearing 20 suitable for use in rotary wing aircraft 52. FIG. 1D depicts an annular wear-indicating bearing 20 suitable for use in rotary wing aircraft 52.

Even though the figures depict various embodiments of bearing 20 in connection with a rotary wing aircraft 52, the described embodiments and use of wear-indicating bearing 20 may be suitable in any application in which bearings experiencing repetitive relative motion between two members as described herein are utilized. For example, wear-indicating bearing 20 described herein is suitable for installation and use in water environment applications and non-water environment applications.

Bearing 20 includes a mold bonded laminate bearing stack 26. Bearing stack 26 includes a first end 70, a second end 72, and longitudinal axis 48 between first and second ends, 70 and 72, respectively.

Bearing 20 connects a first member 22 and a second member 24. The design of bearing 20 accommodates repetitive relative motion between first member 22 and second member 24. For example, under operational conditions bearing 20 may experience a repetitive compressive load shown in the direction indicated by numeral 56 between first member 22 and second member 24. Compressive load 56 may be in the same direction as longitudinal axis 48. Bearing 20 may also experience a repetitive alternating shear load, represented by numeral 58, nonparallel to said longitudinal axis 48. Upon degradation of bearing 20 due to the compressive and shear loads, a fracture 44 forms in marker layer 74 and generates a plurality of crumbs 46 of first inner material 38. Crumbs 46 are detectable at an exterior surface 32 of said bearing stack 26.

Figure 2A:
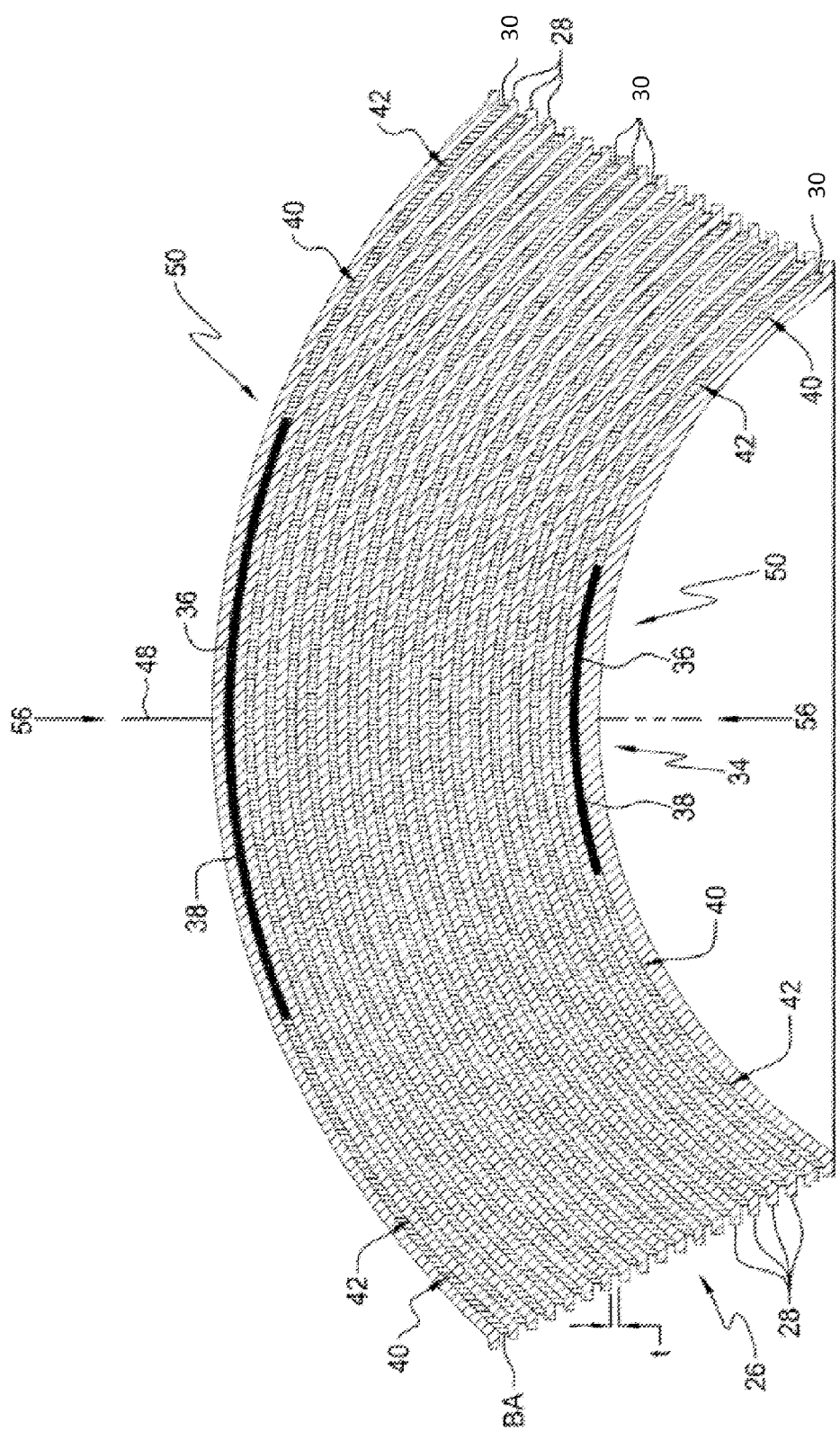
FIGS. 2A-2B illustrate cross-sectional views of an elastomeric mold bonded laminated bearing stack with multiple alternating layers of non-elastomeric shim member layers and elastomeric layers with an interior elastomer region having at least a first interior optical characteristic different than the exterior elastomer region.
Figure 2B:
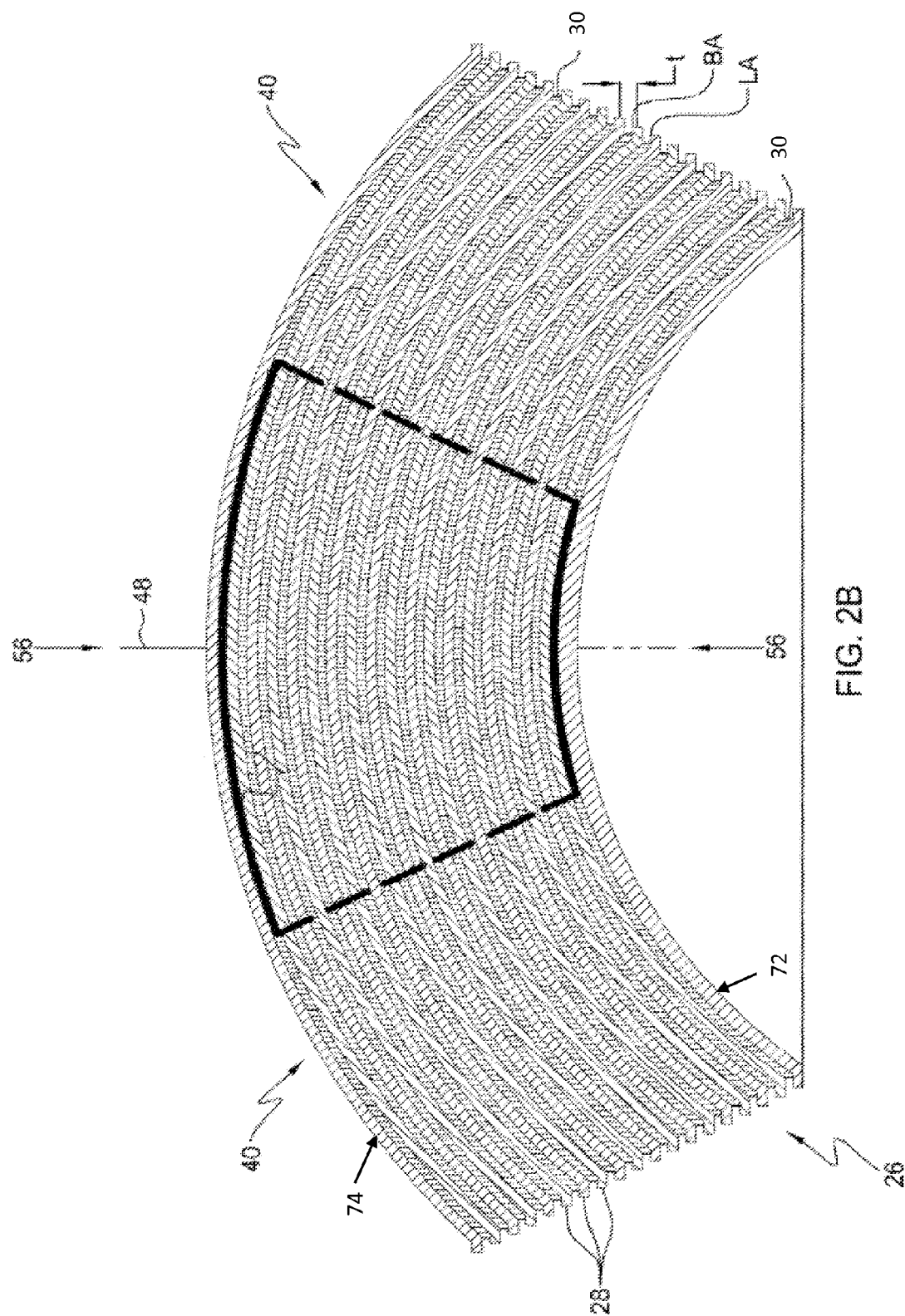
Figure 3A:
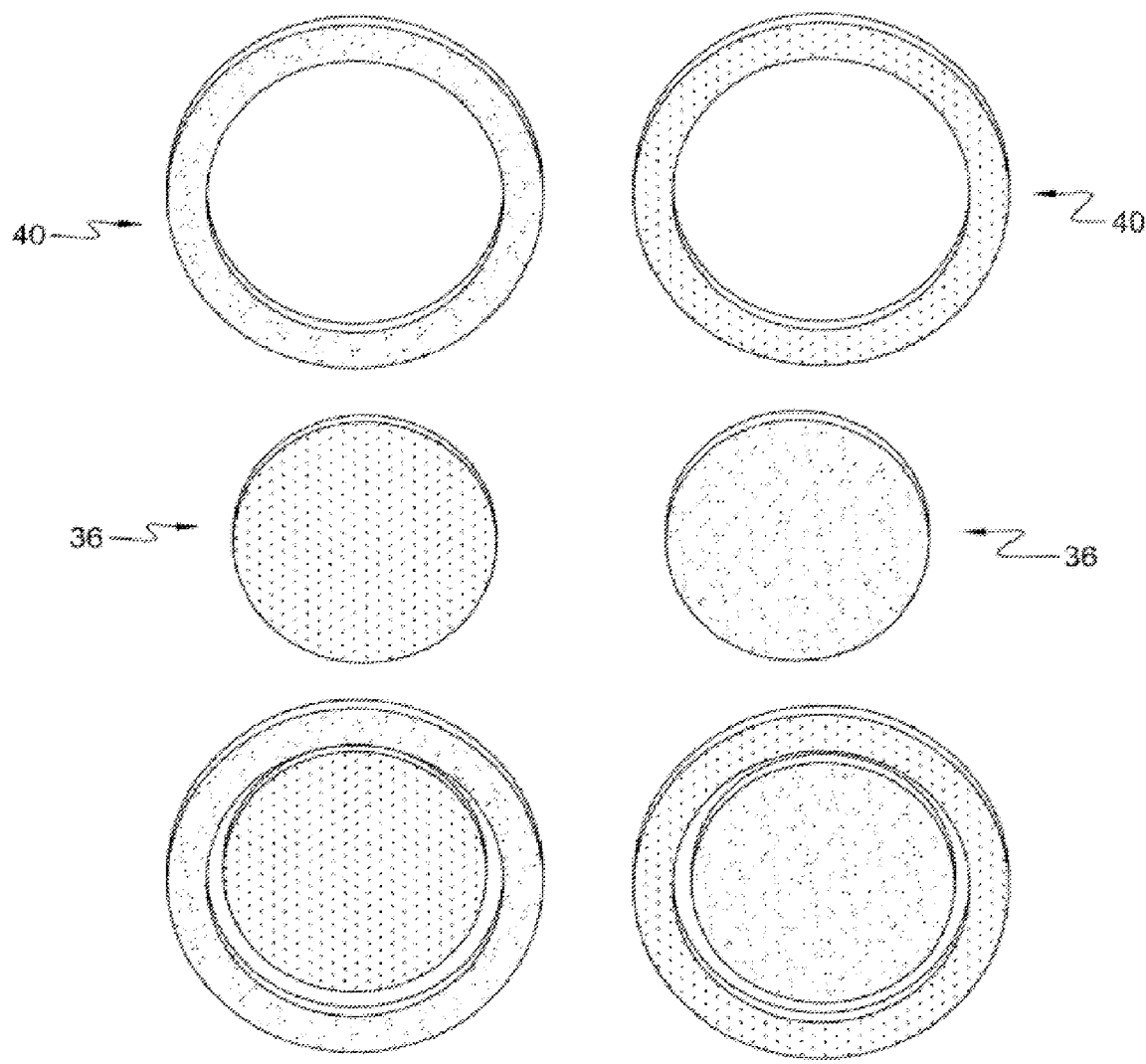
Figure 4:
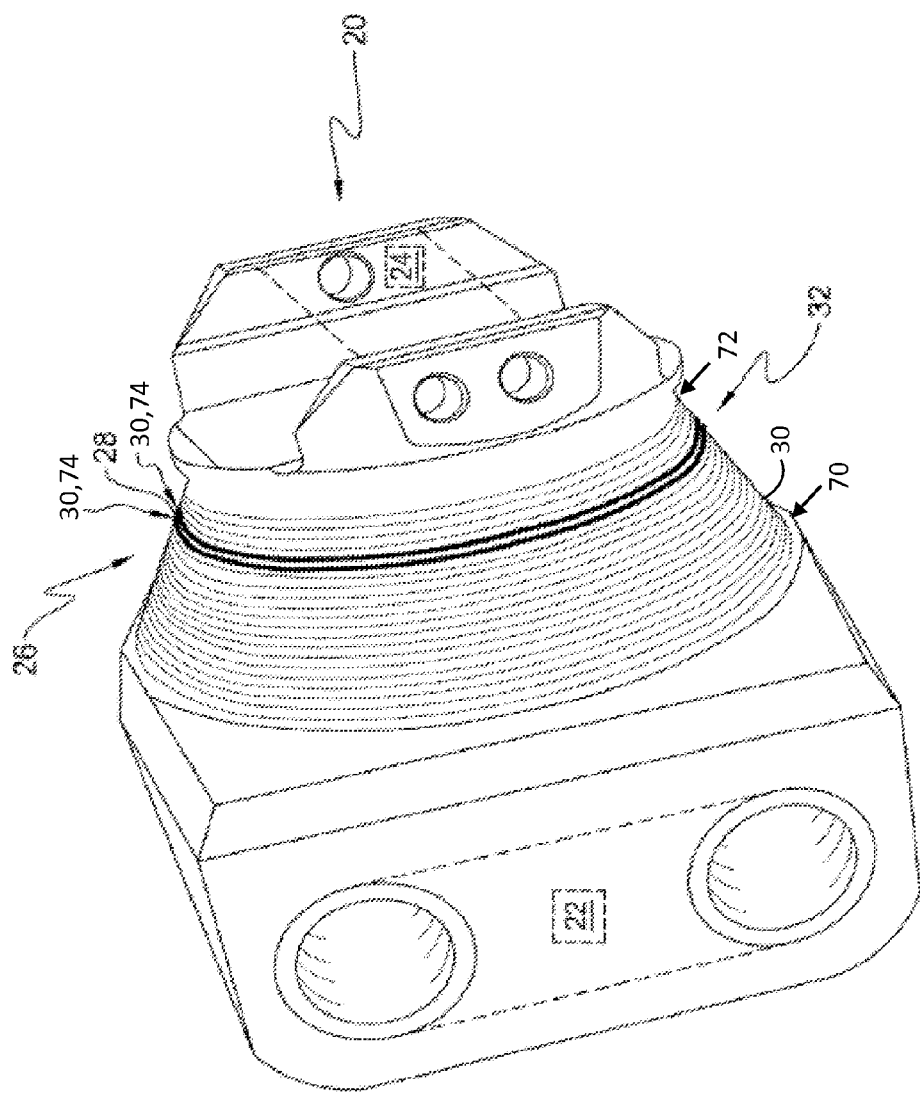
FIG. 4 illustrates a spherical bearing with non-black colored elastomer on the outside exterior surface of two elastomeric shim member layers.

As shown in FIGS. 2A and 2B, and FIG. 4, bearing stack 26 includes alternating layers of elastomeric material layers 30 and non-elastomeric shim material layers 28. FIGS. 2A and 2B depict cross-sectional views of the alternating layers of elastomeric material layers 30 and non-elastomeric shim material layers 28 of bearing stack 26.

Elastomeric layer 30 and non-elastomeric layer 28 are concentrically arranged about longitudinal axis 48 with each elastomeric material layer 30 sandwiched between at least two non-elastomeric material layers 28 as depicted in FIGS. 2A and 2B. Referring to FIGS. 2A and 2B, first end 70 of bearing stack 26 is a non-elastomeric layer 28 and second end 72 of bearing stack 26 is also a non-elastomeric layer 30.

In bearing stack 26 at least one elastomeric layer 30 functions as a marker layer 74. Marker layer 74 can be seen in FIGS. 3A, 3B, 4, and 9-16. Marker layer 74 is configured to indicate wear or fatigue of bearing 20. Marker layer 74 is made up of a first elastomeric composition 38 and second elastomeric composition 42. For example, first elastomeric composition 38 and second elastomeric composition 42 may include different ingredients such as different rubber composition ingredients and/or different optical characteristic ingredients or may be the same rubber composition ingredients but include different optical ingredients. As a result, first elastomeric composition 38 and second elastomeric composition 42 are different. In some embodiments, the external surface 32 of bearing stack 26 has a substantially similar appearance to second elastomeric composition 42. In other embodiments, for example, as shown in FIG. 4, exterior surface 32 of marker layers 74 may have a different appearance than external surface 32 of other elastomeric layers 30.

First elastomeric composition 38 includes a first optical characteristic ingredient. First elastomeric composition 38 defines an interior elastomeric region 36. A second elastomeric composition 42, having a second optical characteristic ingredient, defines an exterior elastomeric region 40 which envelops interior elastomeric region 36. Typically, exterior elastomeric region 40 and first elastomeric composition 38 will have a coplanar and concentric relationship such that the interior and exterior elastomeric regions 36 and 40, respectively, are centered about the bearing center axis 48 or longitudinal axis 48. With reference to FIGS. 9B, 15B, and 16B, a single elastomeric composition forms elastomeric layers 30 that are not marker layer 74. Typically, the single elastomeric composition is second elastomeric composition 42.

Marker layer 74, as shown in FIG. 9A, has a radius r defined from a center 34 of elastomeric layer 30. Referring to FIGS. 3B, 9A and 10A, interior elastomeric region 36 and exterior elastomeric region 40 of marker layer 74 have a combined radius of r. Exterior elastomeric region 40 extends outward from the perimeter of interior elastomeric region 36 a distance d up to the perimeter of marker layer 74. Distance d of exterior elastomeric region 40 is in the range of 0.01 r to 0.5 r. In other embodiments d is in the range of 0.02 r to 0.3 r. Interior elastomeric region 36 has a radius of q, where interior elastomeric region 36 is r–d (r minus d).

The dimensions of r, q, and d are predetermined based on the end-use application of bearing 20. For example, the dimensions r, q, and d are sized and calibrated based on desired service life for bearing 20 and other parameters set based on historical testing or performance characteristics for the intended end-use application or environment of bearing 20. Interior elastomer region 36 cannot be seen upon initial installation of bearing 20 in bearing location 54 or when bearing stack 26 is removed from the mold. Preferably, interior elastomer region 36 is located a predetermined distance from exterior surface 32 of bearing stack 26 with the distance based on the calibration established by the replacement criteria for bearing 20.

The intended end-use environment of bearing stack 26 and any historical or known instances where bearing 20 first typically experiences wear or fatigue will determine the placement of marker layer 74 within bearing stack 26. When positioned within a predetermined layer within bearing stack 26 corresponding to the likely point of initial failure for the particular use of bearing 20, marker layer 74 will evidence fatigue in the form of a fracture, crack, or fissure 44. As fracture 44 extends from exterior surface 32 of bearing stack 26 inward toward the bearing center or toward the interior region 36 due to torsion experienced by bearing 20, fracture 44 evidences the approaching failure of bearing stack 26 by producing a plurality of detectable elastomeric crumbs 46 of the first elastomeric composition 38. Crumbs 46 are expelled through fracture 44 to exterior surface 32. Crumbs 46 are sticky and may be configured to persist on exterior surface 32.

Figure 5A:
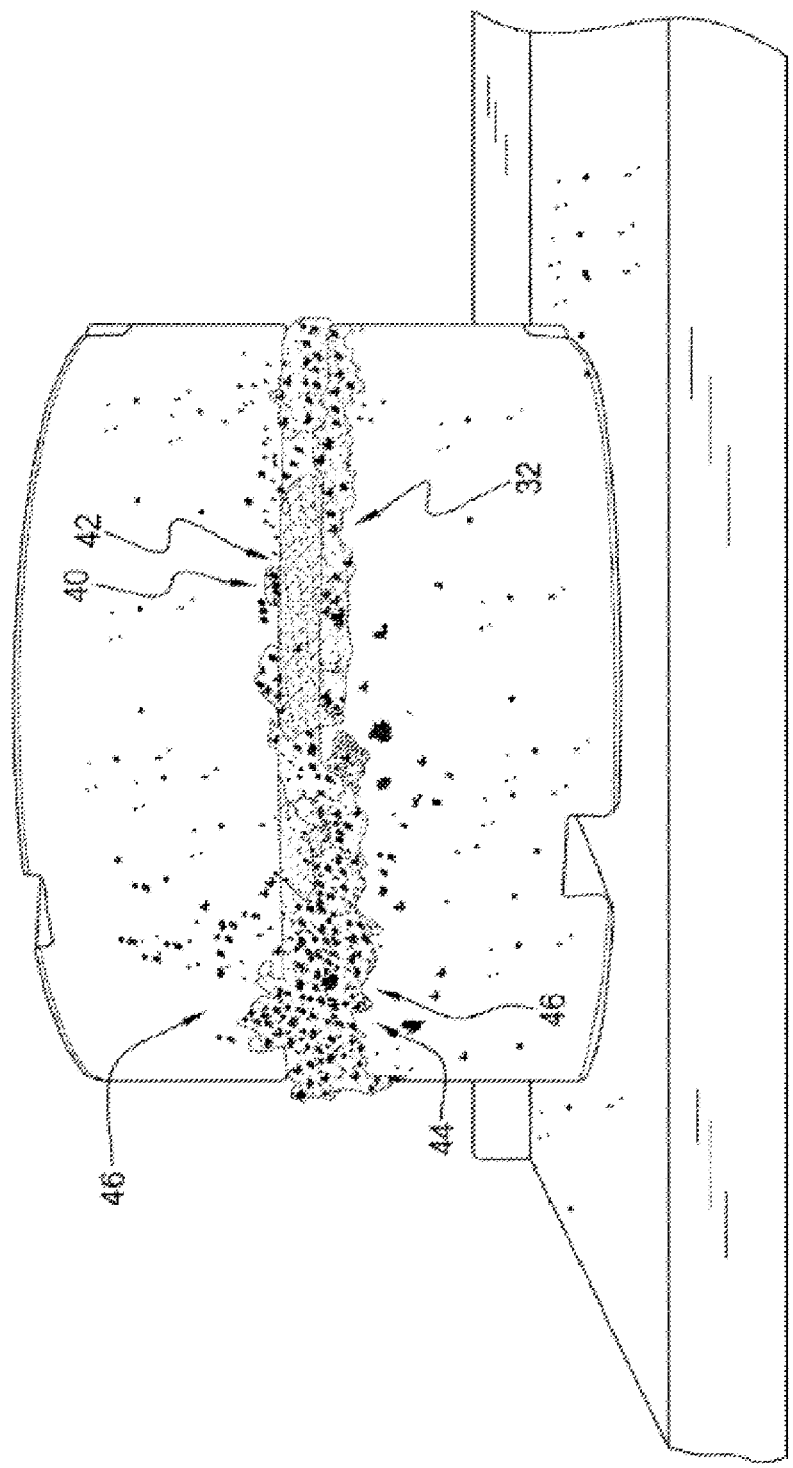
Figure 6:
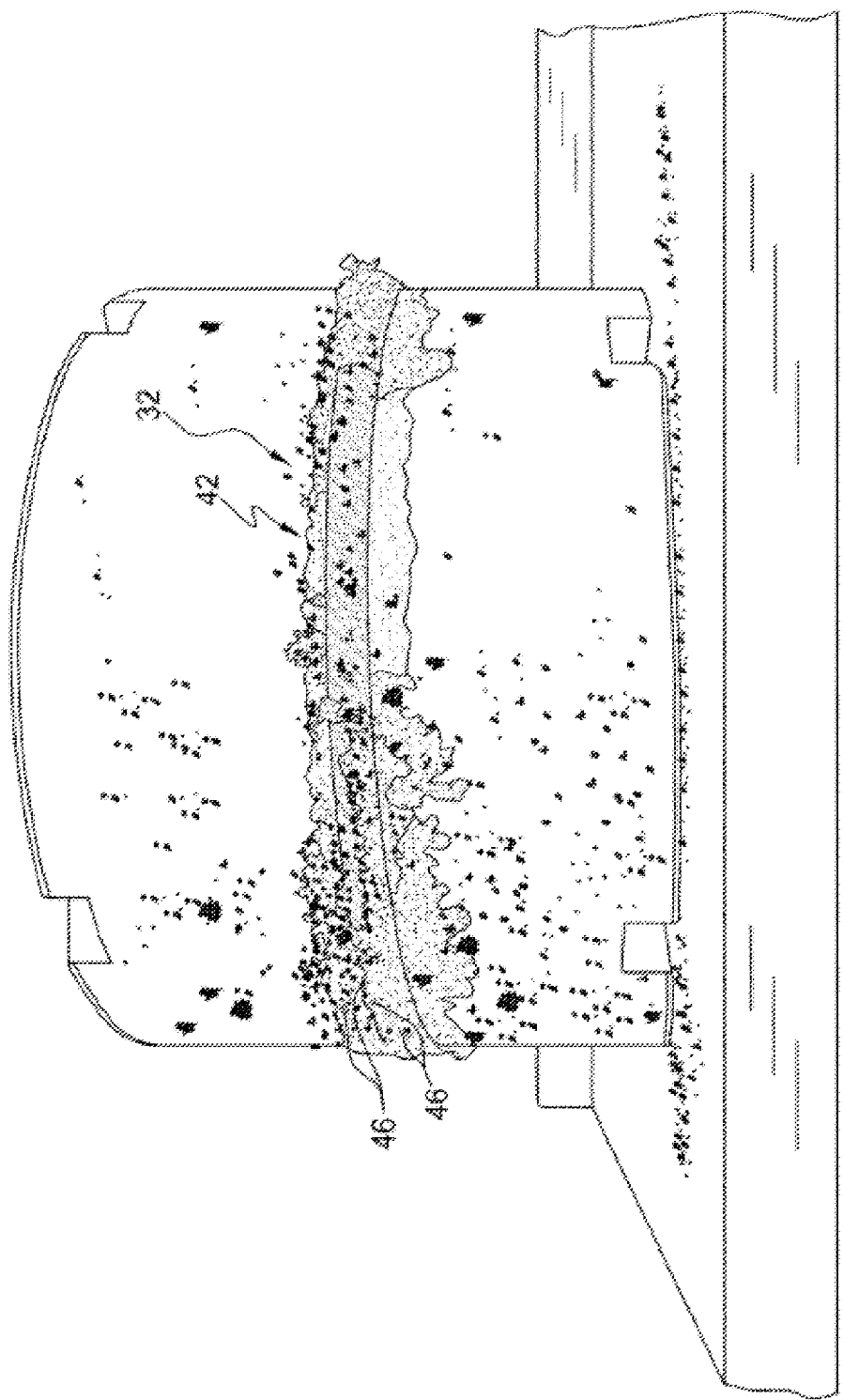

FIGS. 5A, 5B, and 6 depict the results of torsional fatigue tests illustrating distinguishable elastomeric crumbs 46 expelled from interior region 36 of bearing 20 and persisting on exterior surface 32.

Upon fracture 44 reaching interior elastomer region 36, crumbs 46 having a different appearance, for example a different color than exterior elastomer region 40, or a different optical characteristic ingredient, will collect and persist within fracture 44 and/or on exterior surface 32 of bearing stack 26. The presence of the different colored crumbs or change in appearance of crumbs 46 when exposed to an inspection fluid or exposed to ultraviolet light provide an indication of wear that fracture 44 has a reached a certain depth of bearing 20, and thus indicates bearing 20 has met or is near its predetermined service-life replacement criteria.

For example, the spherical bearing 20 depicted in FIG. 4, includes two marker layers 74 that are colored differently than the other elastomeric layers 30 of bearing stack 26. In this embodiment, the two marker layers 74, have a yellow colored elastomer exterior elastomer region 40 and exterior surface 32 and include a black interior region 36 therein (not depicted). In this example, marker layers 74 are selected to be positioned in the fifth and sixth elastomer layer (counting down bearing stack 26 from second end 72). The fifth and sixth elastomer layers were selected based on historical studies and testing which showed that layers five and six are prone to degradation and that elastomeric damage should be expected to develop at these locations first. As a result, when bearing 20 begins to degrade, a fracture 44 forms and extends toward interior elastomer region 36. Upon reaching the interior elastomer region 36, black crumbs 46 from interior elastomeric region 36 may accumulate on the yellow colored exterior elastomer region 40 and exterior surface 32 of layers five and six and thus, provide a wear-indication to an observer based on the difference in color on bearing stack 26. In this example, distance d of exterior elastomer region 40 was ⅜ inch, approximately between 10% to 25% of the combined radius r.

As depicted in FIGS. 11A and 15B, annular bearings or bearings having a hollow center, r is defined from the centerline of the marker layer 74.

In some embodiments marker layer 74 further includes a third elastomeric composition 38' as shown in FIGS. 16A and 16B. The third elastomeric composition 38' defines a second interior elastomeric region 76 concentric about longitudinal axis 48. As used herein, second interior elastomeric region 76 may also be referred to as third elastomeric region 76. The third elastomeric composition 38' has a third optical characteristic ingredient. The third elastomeric composition 38' may be compositionally and/or optically different than first and second elastomeric compositions, 38, and 42, respectively. The third elastomeric region 76 is proximate to and enveloped by first interior region 36. As previously discussed, first interior region 36 is enveloped by exterior elastomeric region 40. All regions are concentric and coplanar.

As shown in FIG. 16A, marker layer 74 has a combined radius r of the first and second interior elastomeric regions 36 and 76, respectively, and outer exterior elastomeric region 40. As shown in FIG. 16A, exterior region 40 extends from the outer perimeter of the combined interior elastomeric region a distance d. The first interior elastomeric region 36 extends a distance of $q_2$ and the innermost interior elastomeric region 76 extends distance $q_1$. For example, in embodiments having this configuration, the first interior elastomeric region 40 provides a first indication of the first depth range fracture 44 has reached within bearing 20 and the second interior elastomeric region 76 provides a second indication of the second depth range fracture 44 progressed within bearing 20.

The first, second, and third elastomeric compositions, 38, 42, and 38', respectively, are typically based on diene rubber, preferably natural rubber, polyisoprene, polybutadiene, styrene butadiene and blends thereof. The elastomers are formulated to be non-optically similar and compatible so they can be cured together as one elastomeric shim layer 30, and also distinct, either under human visible light or other electromagnetic spectrum wavelengths such as under ultraviolet light.

For example, one elastomeric composition may be reinforced with carbon black and another by precipitated or fumed silica as a carbon black substitute. When using silica as a carbon black substitute, it is preferred to include a silane coupling agent to increase the interaction between the silica and the polymer. The silica-reinforced elastomer composition may be colored by adding either organic or inorganic pigments or dyes, activated dyes.

The elastomeric compositions are provided with optically different characteristics via optical characteristic ingredients such as made white, rust brown red, and/or green through the addition of titanium dioxide, red iron oxide, and chromium oxide or with green phthalocyanine, respectively. In some embodiments pigments or dyes, including fluorescent pigment dyes are used to achieve visually distinct elastomeric compositions. In other embodiments, the dyes or pigments are water-soluble and activated by an inspection fluid. Other embodiments may use combinations of the above described embodiments.

An example of a distinguishable optical characteristic ingredient includes a water soluble form of fluorescein (called sodium fluorescein or uranine yellow). Sodium fluorescein is not soluble in the elastomer rubber but is readily soluble in water. When exposed to water, sodium fluorescein produces an intense yellow-green color. Sodium fluorescein and other compounds having similar properties may be included in first elastomeric composition 38 of marker layer 74 when bearing 20 is installed in a water environment.

Figure 17:
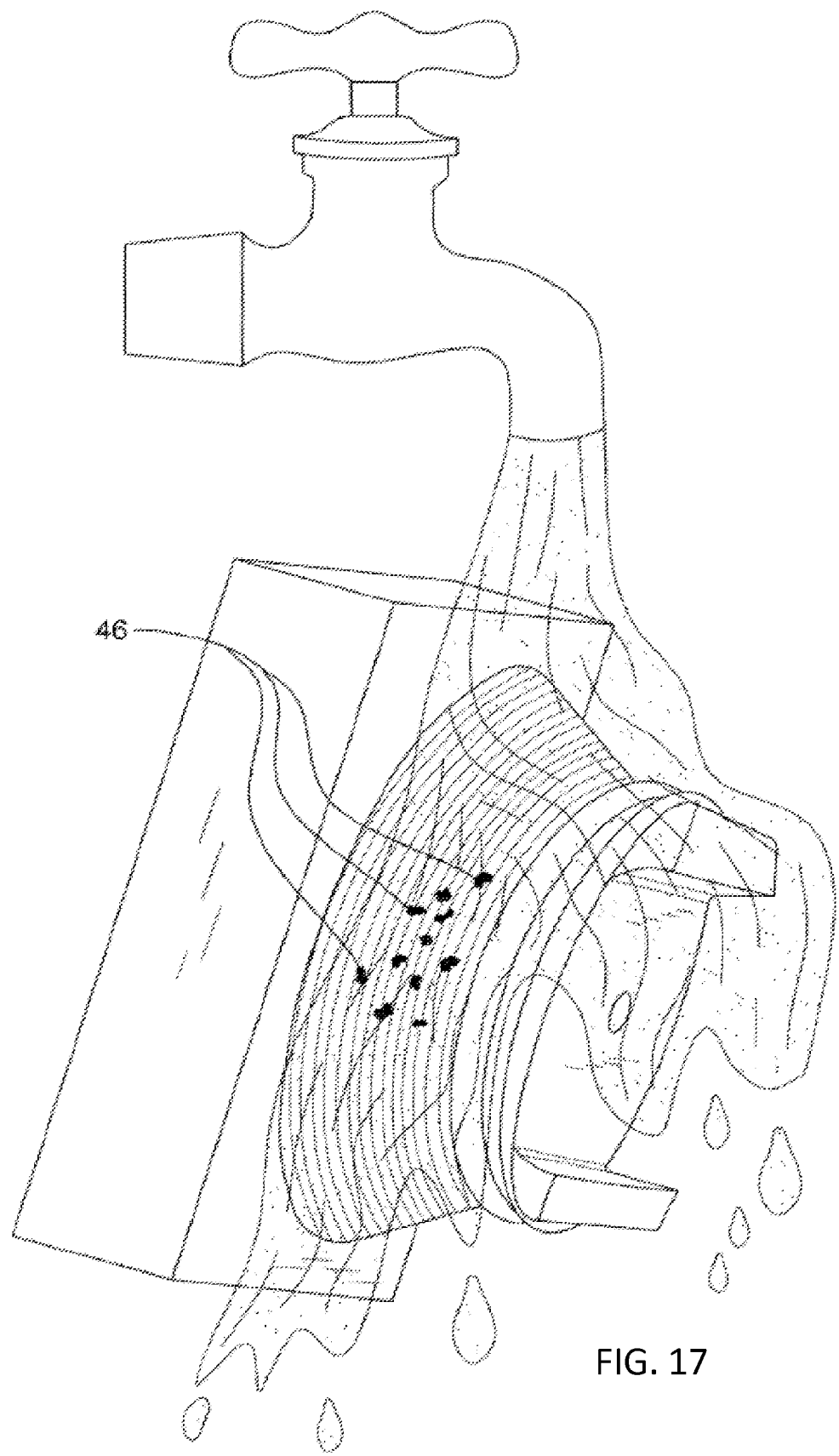
FIG. 17 illustrates expelled elastomeric crumbs staying on the bearing when exposed to a forceful stream of water.

The inclusion of sodium fluorescein in the interior elastomeric region 36 provides a visual or optical indication of fracture 44 depth when the elastomeric crumbs 46 or the fracture 44 itself is exposed to water and turns the water yellow. Expelled interior crumbs 46 may be inspected by water activation by exposing the expelled elastomeric crumbs 46 to water (as shown in FIG. 17), such as with water flushing, water spray, or wiping with a wet material, or installation of bearing 20 in a water environment. It should be appreciated that whatever optical characteristic ingredient that is used within elastomeric layer 30 not be soluble in the elastomer rubber during the mold and curing process.

Below are examples of optically and/or visually distinguishable rubber elastomers with different distinguishable optical characteristic ingredients:

| | Optical Character color | | | | | |
|---|---|---|---|---|---|---|
| Ingredient | Black | Red | White | Yellow | Green | Black with Yellow Indicator |
| Natural rubber | 60.0 | 60.0 | 60.0 | 60.0 | 60.0 | 60.0 |
| Polybutadiene rubber | 30.0 | 30.0 | 30.0 | 30.0 | 30.0 | 30.0 |
| Styrene butadiene rubber | 10.0 | 10.0 | 10.0 | 10.0 | 10.0 | 10.0 |
| Aromatic oil | 5.0 | 5.0 | 5.0 | 5.0 | 5.0 | 5.0 |
| Stearic acid | 2.0 | 2.0 | 2.0 | 2.0 | 2.0 | 2.0 |
| Zinc oxide | 5.0 | 5.0 | 5.0 | 5.0 | 5.0 | 5.0 |
| Sulfur | 1.8 | 1.8 | 1.8 | 1.8 | 1.8 | 1.8 |
| CBTS (accelerator) | 1.2 | 1.2 | 1.2 | 1.2 | 1.2 | 1.2 |
| Si-69 Silane | — | 5.0 | 5.0 | 5.0 | 5.0 | — |
| N330 carbon black | 45.0 | — | — | — | — | 45.0 |

-continued

| Ingredient | Optical Character color | | | | | |
|---|---|---|---|---|---|---|
| | Black | Red | White | Yellow | Green | Black with Yellow Indicator |
| Hi-Sil 233 silica | — | 40.0 | 40.0 | 40.0 | 40.0 | — |
| Titanium dioxide | — | 8.0 | 5.0 | 2.0 | 5.0 | — |
| Red iron oxide | — | — | 1.0 | — | — | — |
| Chromium Green oxide | — | — | — | — | 2.0 | — |
| Yellow 2555 pigment | — | — | — | 2.5 | — | — |
| Sodium fluorescein | — | — | — | — | — | 5.0 |

As shown in FIGS. 2A, 2B, 9-12, 15B and 16B, elastomeric layer 30 has a thickness t Thickness t is defined in the same direction as the longitudinal axis 48 for bearing a compressive between non-elastomeric members 28. Elastomeric layer 30 also has an exterior surface bulge area BA and a bonded elastomeric interface load area LA. Interface load area LA corresponds to the bond interface between the elastomeric layer 30 and non-elastomeric layer 28. For example, as shown in FIG. 13B, elastomeric layer 30 has a thickness t in the same direction as longitudinal axis 48 with load area LA as the interface bond between elastomeric layer 30 and non-elastomeric shim layers 28' and 28".

Elastomeric layer 30 also has a shape factor SF with 0.1<SF<60, preferably with SF=LA/BA and 0.25≤SF≤50. Preferably the interior elastomeric region 36 bonded interface load area compared to the total LA is between 25% to 98% of the total LA, preferably 50% to 96% of the total LA.

Figure 7:
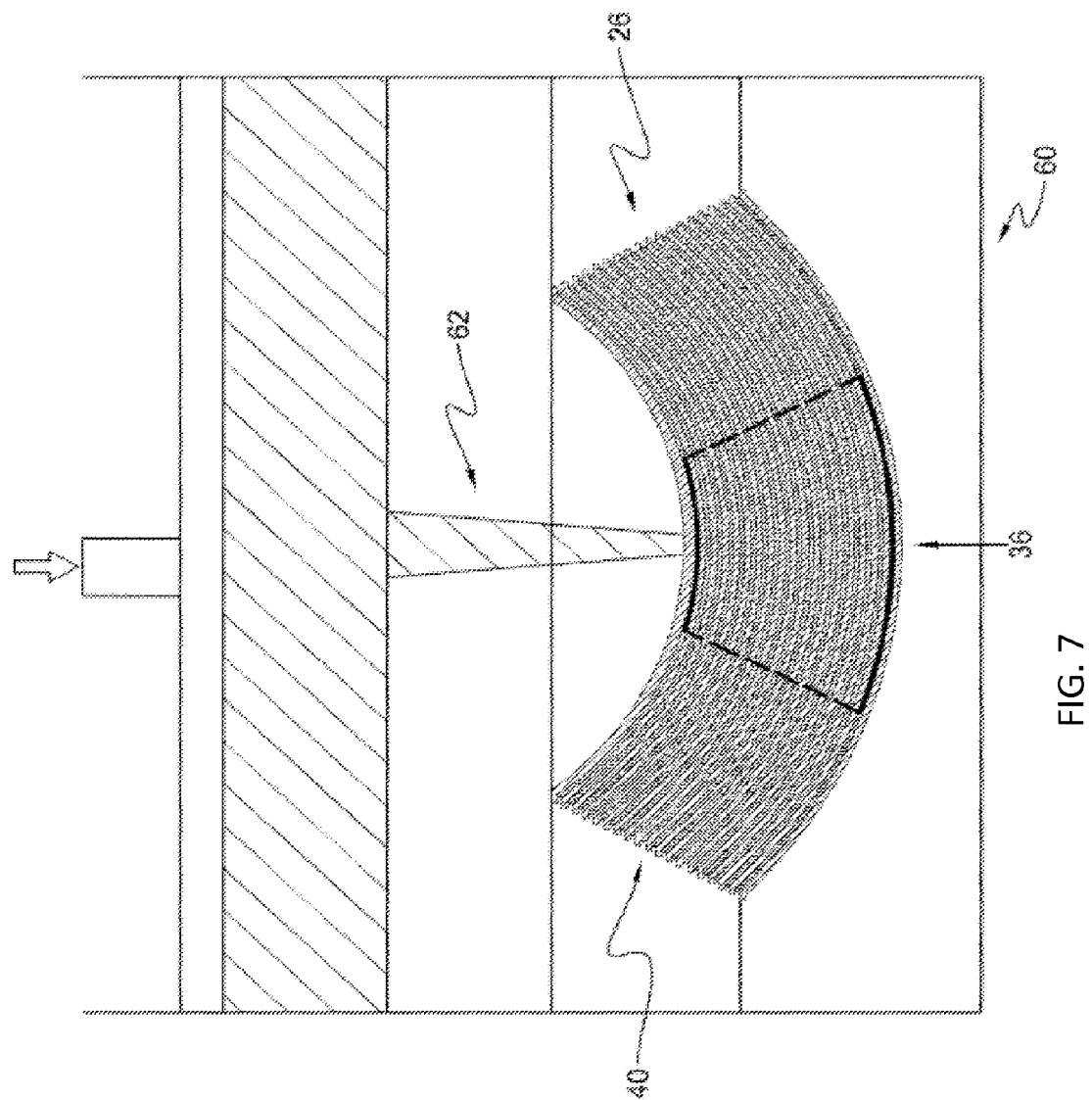
FIG. 7 illustrates a mold for bonding non-elastomeric shim members and elastomeric shim member layers together to provide an alternating laminated bearing stack. The mold having an elastomer transfer sprue proximate the interior elastomeric region.
Figure 8:
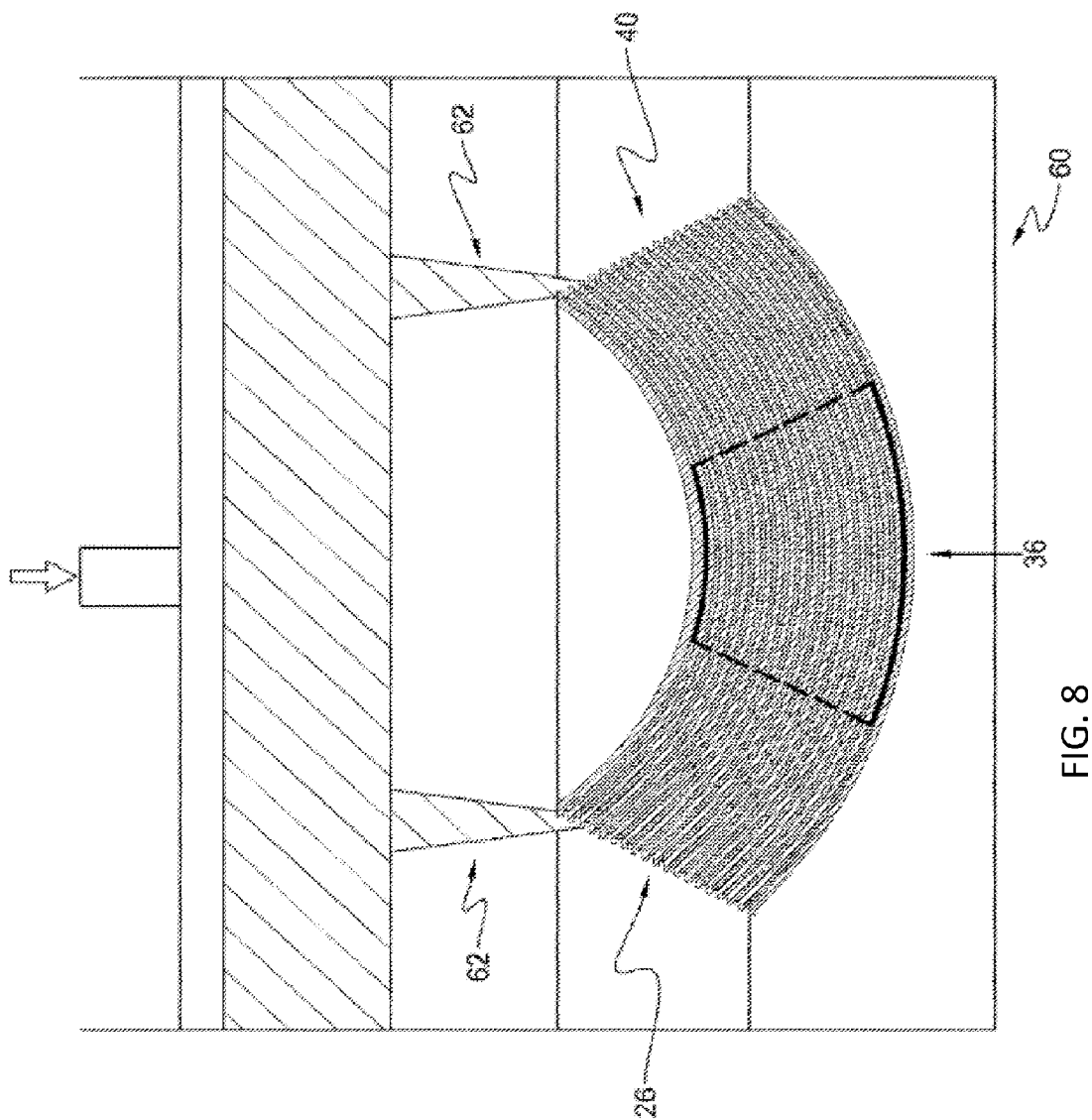
FIG. 8 illustrates a mold for bonding non-elastomeric shim members and elastomeric shim member layers together to provide an alternating laminated bearing stack. The mold having elastomer transfer sprues proximate the exterior elastomeric region.
Figure 9:
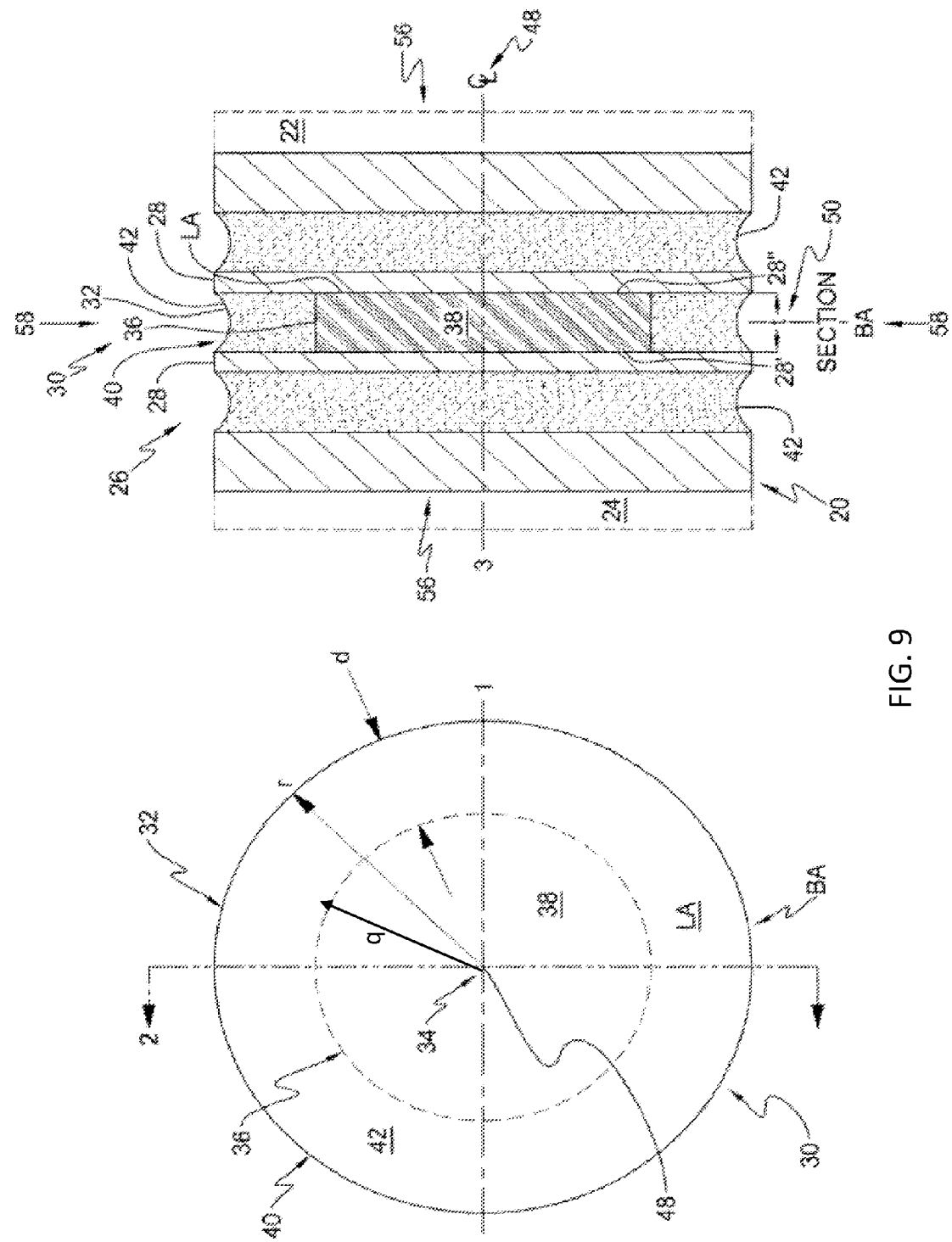
FIGS. 9-16 illustrate views of a wear-indicator bearing marker layer with an interior elastomer region having optical characteristics different than the exterior elastomer region.
Figure 10:
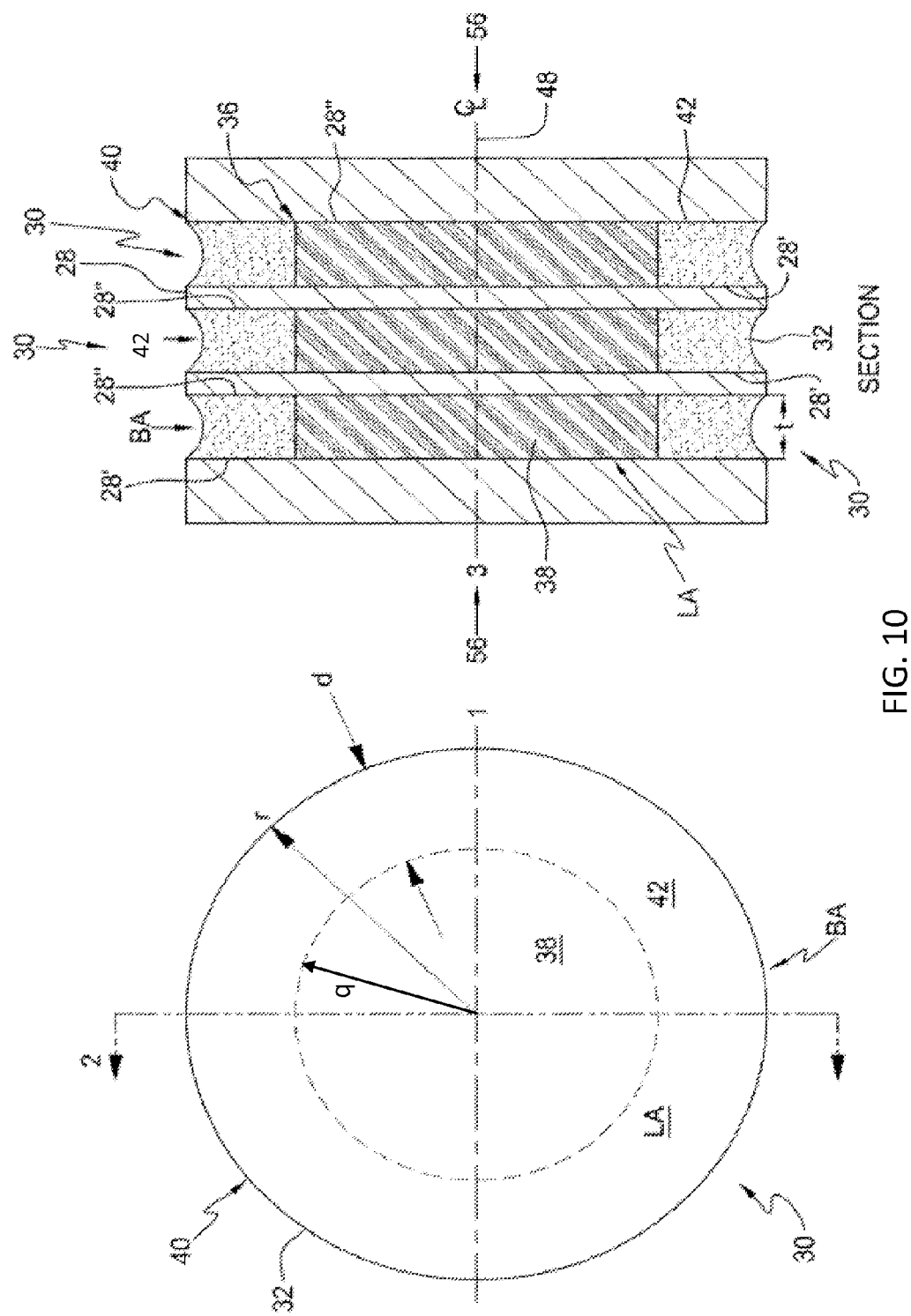
Figure 11:
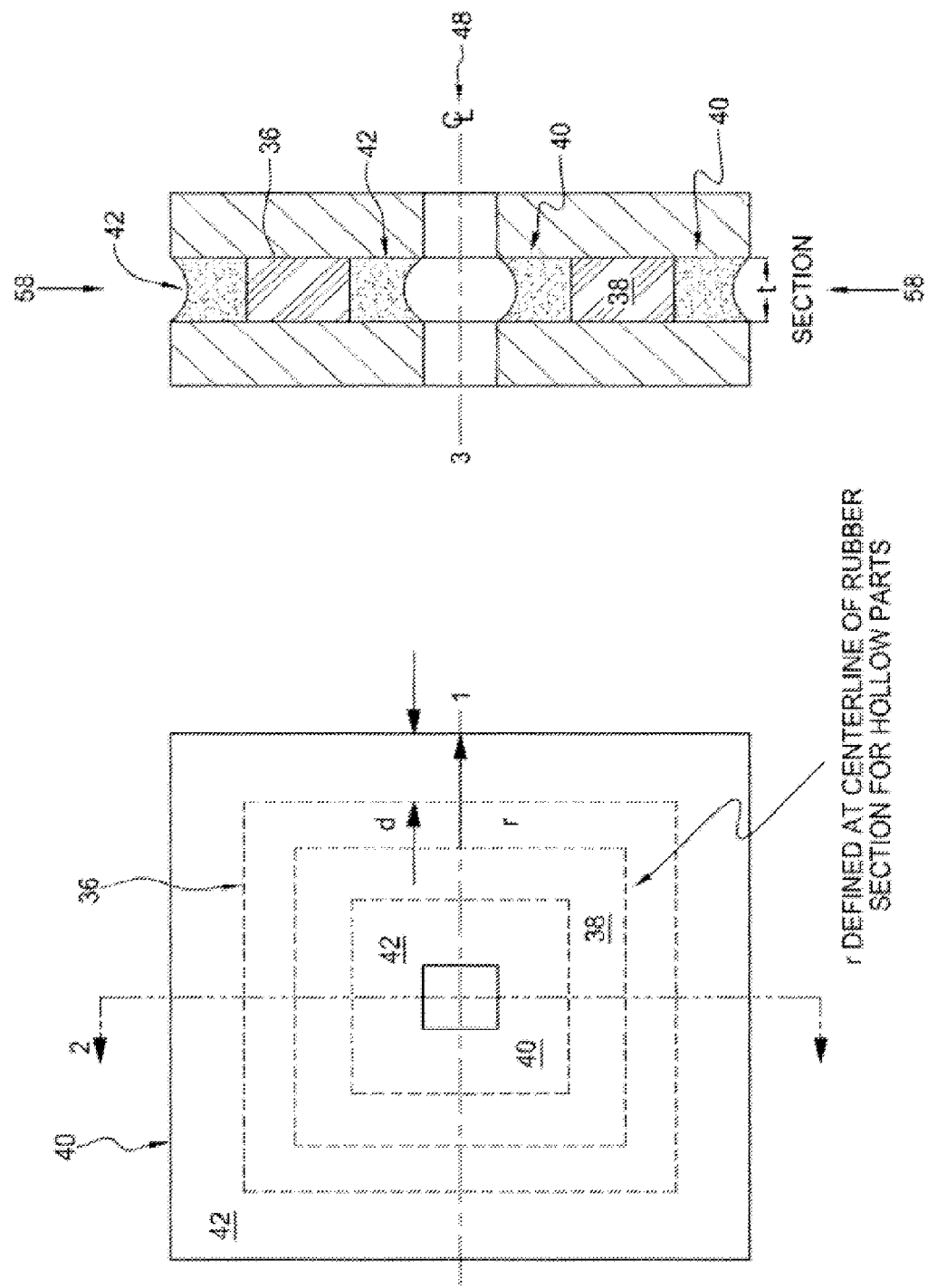
Figure 12:
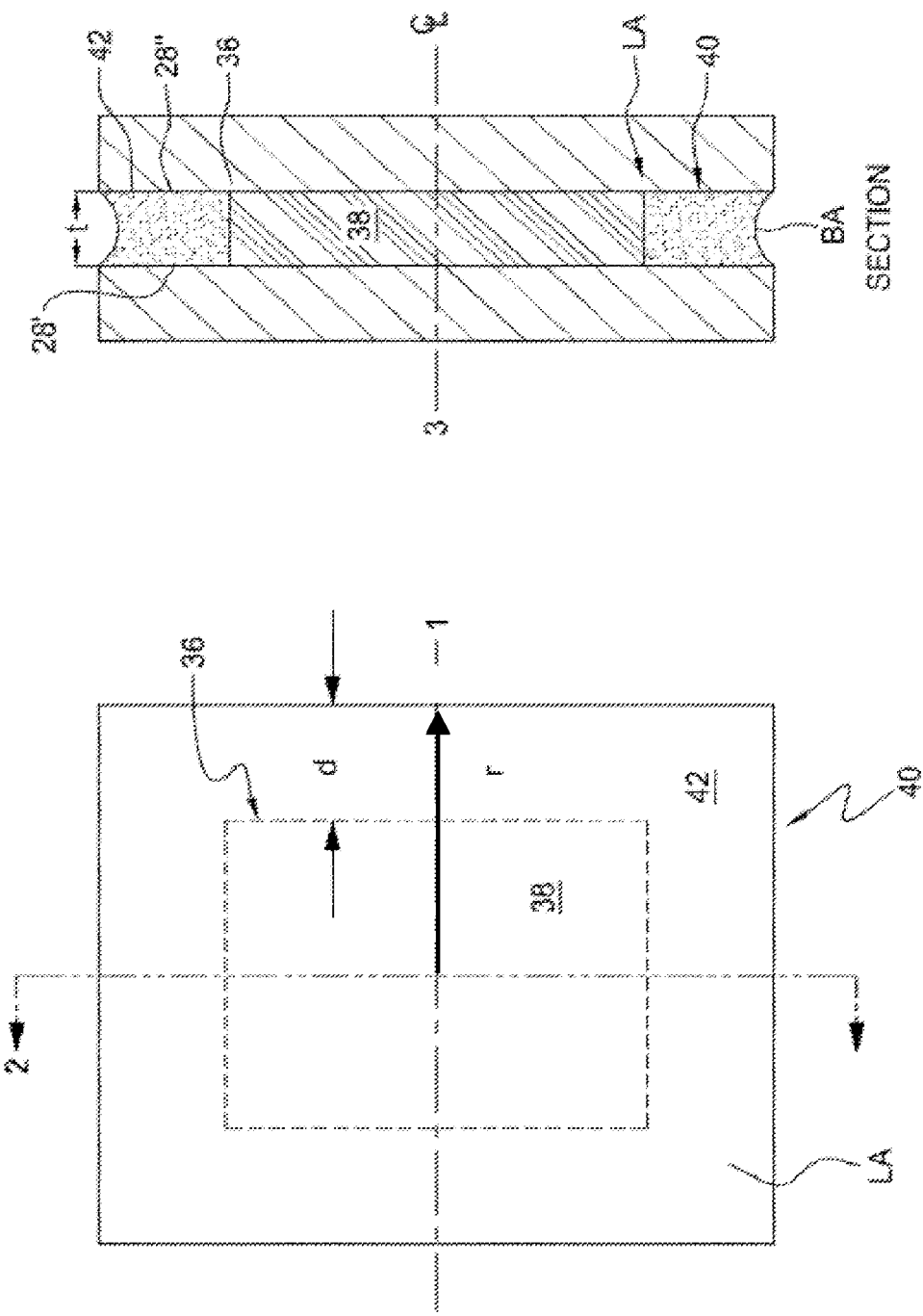
Figure 13:
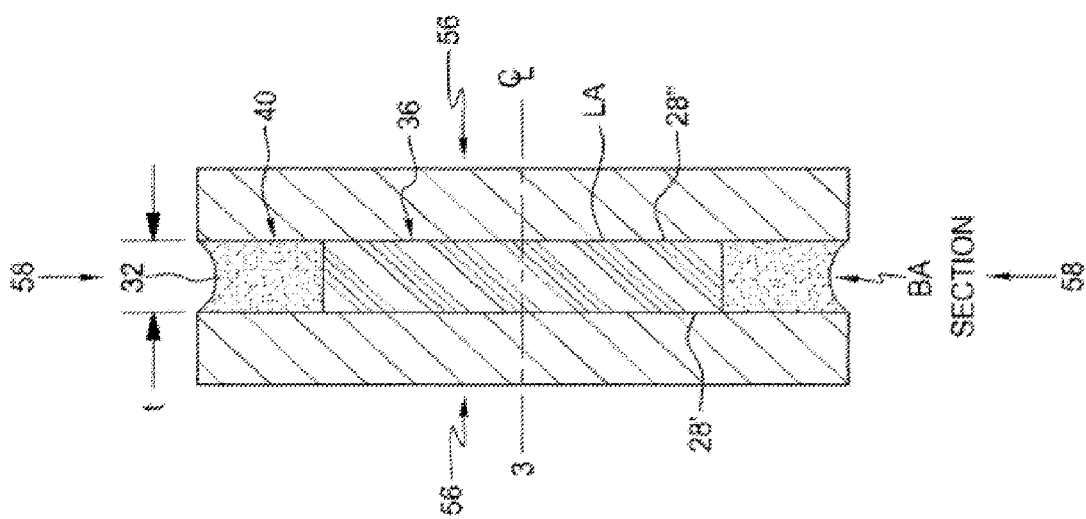
Figure 13:
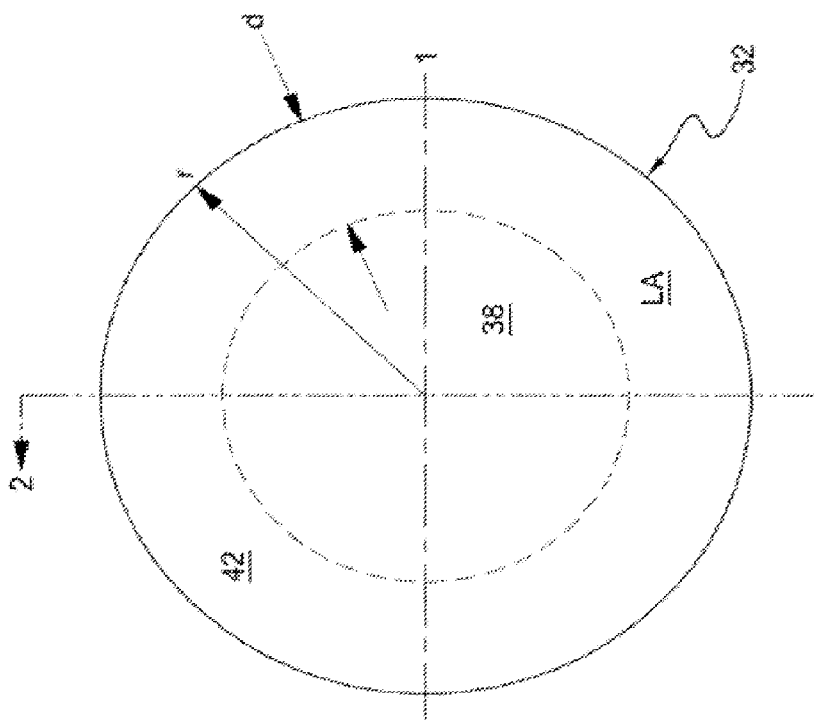
Figure 14:
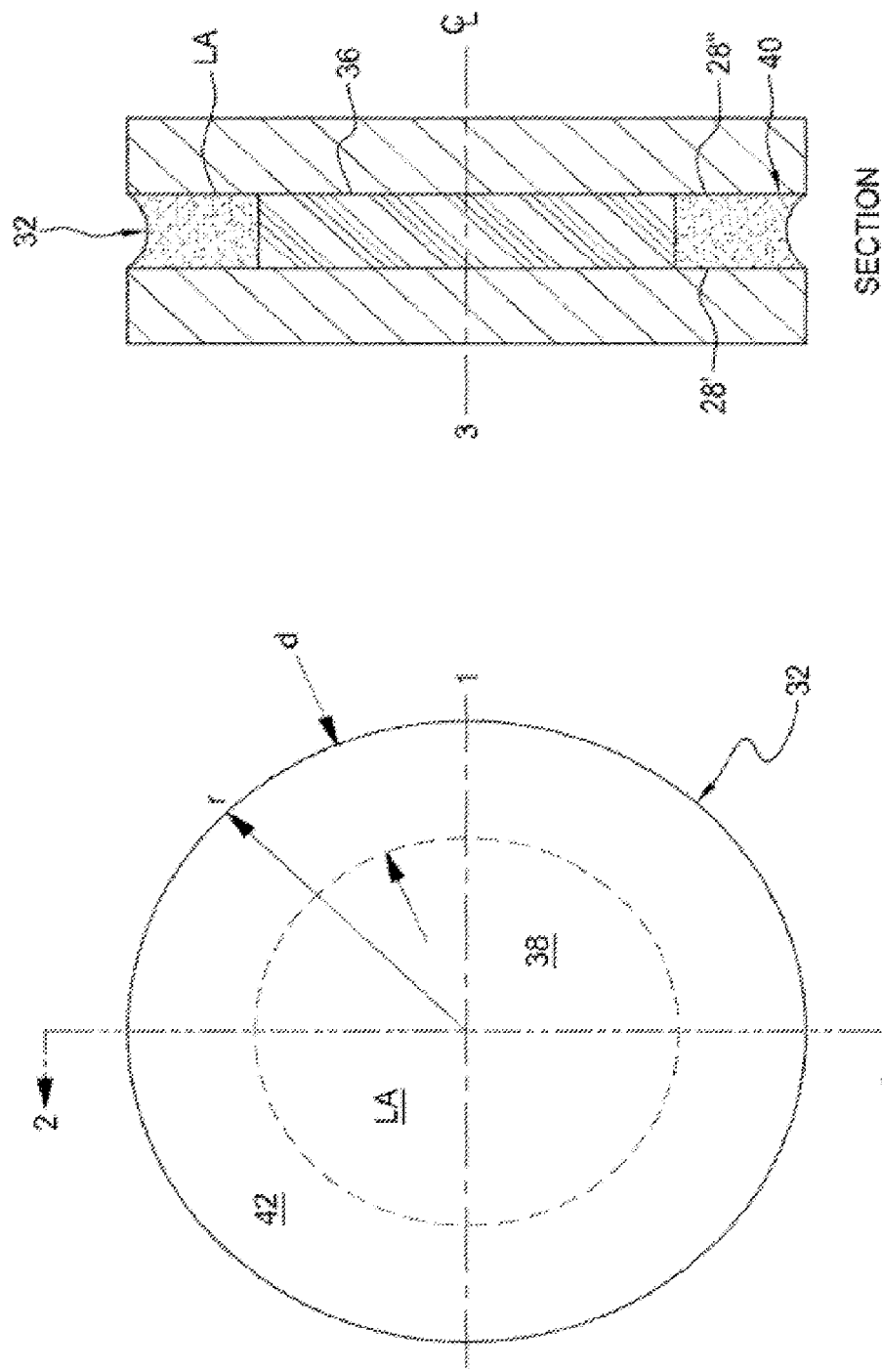
Figure 15:
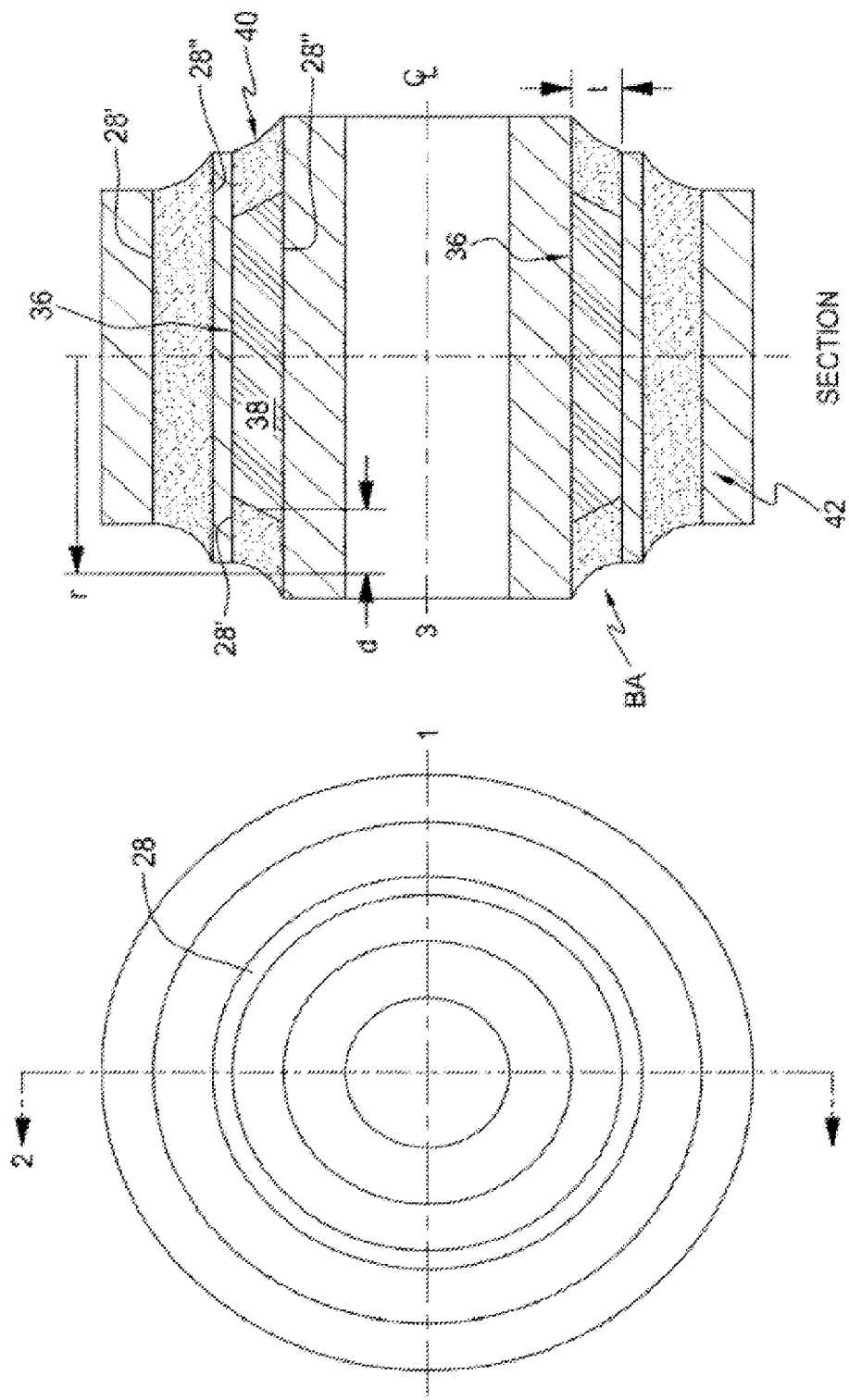
Figure 16:
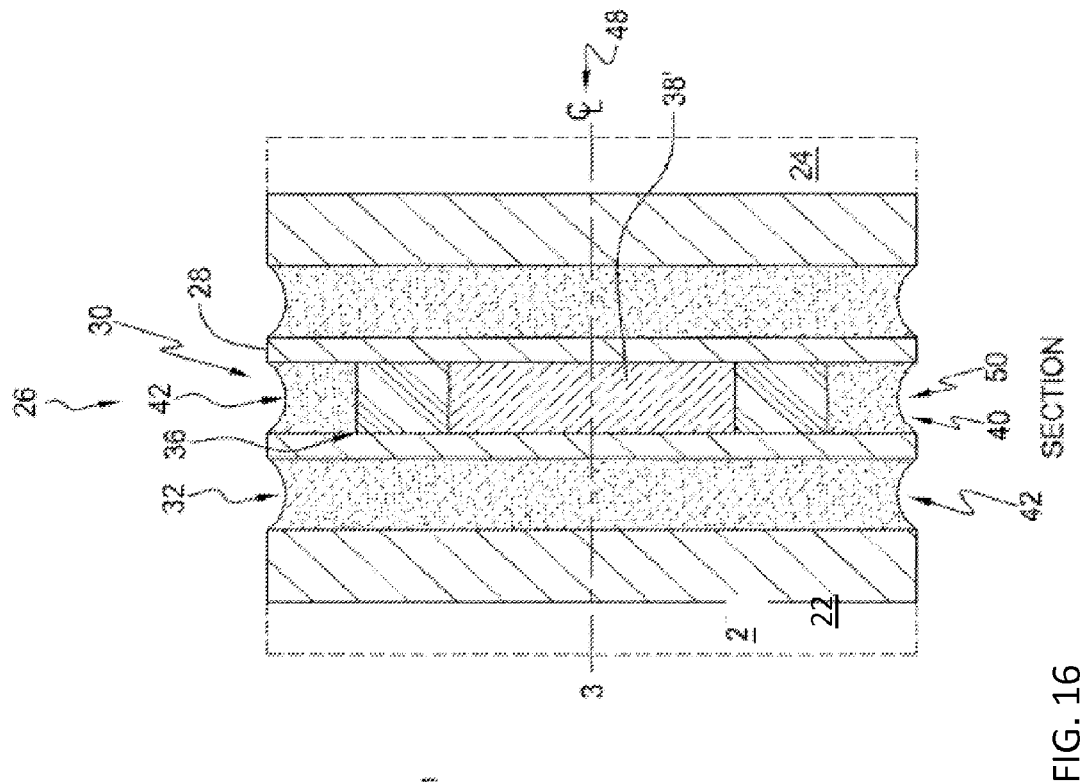
Figure 16:
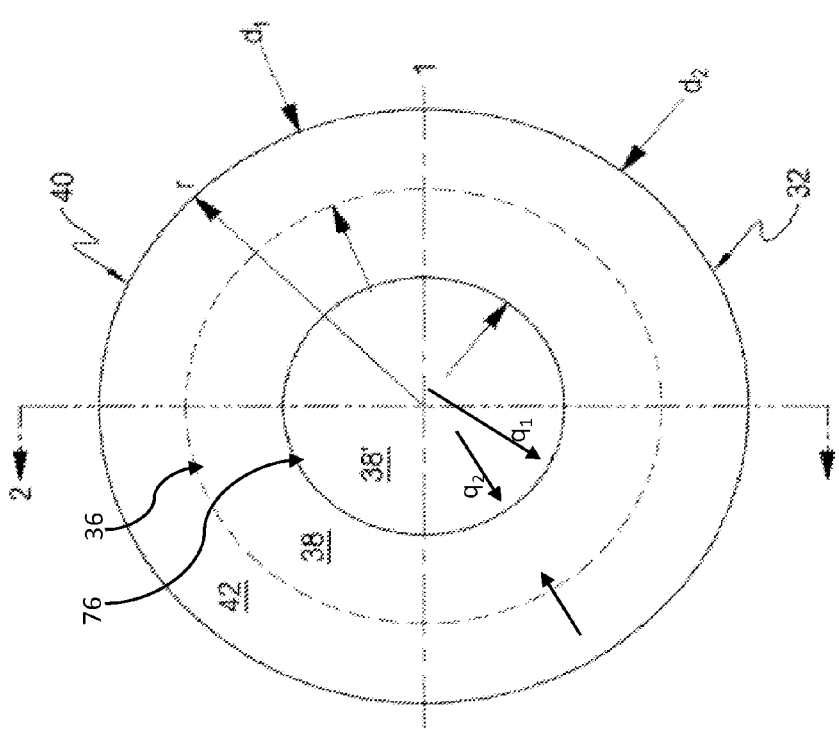

As depicted in FIGS. 7 and 8, bearing stack 26 is formed by mold-bonding non-elastomeric shim layers 28 and elastomeric layers 30, wherein elastomeric layers 30 are cured inside mold 60. Elastomeric transfer sprue 62, shown in FIG. 7, is proximate to interior elastomeric region 36 such that the additional elastomer appears optically similar to the interior elastomeric composition 38. FIG. 8 depicts transfer sprues 62 proximate to exterior elastomeric region 40 and the additional elastomer added to the mold 60 appears optically similar to exterior elastomeric composition 42. FIGS. 7 and 8 illustrate the transfer spues 62 for forming the alternating layers of bearing stack 26.

Also included is a method for identifying and detecting fatigue in bearing 20. The method utilizes bearing 20 and bearing stack 26 described above. The method includes inspecting a bearing 20 for an indication of fatigue.

Upon fatigue of bearing 20, fracture 44 extends from an exterior perimeter of marker layer 74 toward interior elastomeric region 36 and generates a plurality of crumbs 46 of the first elastomeric composition 38. In embodiments having two interior elastomeric regions, fracture 44 extends toward both interior elastomeric region 36 and second interior elastomeric region 76.

The step of detecting fatigue includes inspecting bearing 20 from a distance, e.g. not in direct contact with bearing 20, by visual inspection, or through use of a stimulus, for example exposing bearing 20 to stimulus in the electromagnetic spectrum, for example, such as shining ultraviolet light thereon. Other forms of inspection may include causing a stream of inspection fluid, such as water to contact bearing 20. An indication of fatigue includes crumbs 46 of first elastomeric composition 38 collecting on exterior surface 32 of bearing 20. A further indication of monitoring the depth of fatigue or wearing within bearing 20 is provided by the difference observed in crumbs of first elastomeric composition 38 as well as crumbs of third elastomeric composition 38'. Another indication of monitoring depth of fatigue or wearing within bearing 20 is provided by the difference observed in appearance when a fluorescent ingredient is used in first elastomeric composition 38 and/or third elastomeric composition 38'. When an ultraviolet light is shined on bearing 20, if fracture 44 has reached interior region 36, the fluorescent ingredient will fluoresce.

As previously discussed, the first, second, and third elastomeric compositions 38, 42, and 38', respectively, may be compositionally different and/or optically different. For example, first, second, and third elastomeric compositions can be different by each having different rubber compositions, different colors, and/or first and third elastomeric compositions can be optically different by including a fluorescent ingredient reactive to ultraviolet light, and/or a water-soluble dye, such that upon exposure to an inspection fluid, the water soluble dye causes the inspection fluid to change colors. As a result of the different visual or optical ingredients used, first, second, and third elastomeric compositions 38, 42, and 38' are different compositionally. The method of detecting fatigue in bearing 20 is also a method of monitoring fracture 44 depth within bearing 20.

Other embodiments of the present invention will be apparent to one skilled in the art. As such, the foregoing description merely enables and describes the general uses and methods of the present invention. Accordingly, the follow claims define the true scope of the present invention.

What is claimed is:

1. A wear-indicating bearing comprising:
a bearing stack having a first end and a second end with a longitudinal axis defined between said first and second ends, said bearing stack including a plurality of elastomeric layers each sandwiched between at least two non-elastomeric shim layers, wherein each elastomeric layer is concentric about the longitudinal axis, wherein at least one elastomeric layer is a marker layer configured to indicate wear of said bearing, wherein said marker layer is made up of a first elastomeric composition and a second elastomeric composition, wherein said first and second elastomeric compositions have optically different characteristics.

2. The bearing of claim 1, wherein said marker layer is positioned within the bearing stack at a predetermined degradation position.

3. The bearing of claim 1, wherein said first elastomeric composition defines an interior elastomeric region and said second elastomeric composition defines an exterior elastomeric region surrounding said interior elastomeric region.

4. The bearing of claim 3, wherein said interior and exterior elastomeric regions are coplanar with each other and said regions are concentric about said longitudinal axis.

5. The bearing of claim 3, wherein said marker layer further includes a third elastomeric composition defining a second interior elastomeric region concentric about said longitudinal axis, said third elastomeric composition has an optically different characteristic from said first and second elastomeric compositions, and wherein said interior elastomeric region is positioned between said exterior elastomeric region and said second interior elastomeric region and said exterior elastomeric region, said interior elastomeric region and said second interior elastomeric region are coplanar.

6. The bearing of claim 3, wherein said bearing provides constrained relative motion between a first member and a second member, wherein upon fatigue of said bearing a fracture extends from an exterior perimeter of said marker layer toward said interior elastomeric region and generates a plurality of crumbs of said first elastomeric composition, said plurality of crumbs detectable at an exterior surface of said bearing stack.

7. The bearing of claim 3, wherein said interior and exterior elastomeric regions of said marker layer have a combined radius of (r) and said exterior elastomeric region extends outward from the perimeter of said interior elastomeric region a distance (d), wherein (d) is in the range from 0.01 r to 0.5 r.

8. The bearing of claim 1, wherein said bearing stack includes two or more marker layers positioned within said bearing stack at two or more different predetermined layers configured to indicate wear of said bearing.

9. The bearing of claim 1, wherein said bearing is configured to accommodate a compressive load in the direction of said longitudinal axis and a shear load nonparallel to said longitudinal axis and said bearing configured such that upon degradation of said bearing due to said compressive and shear loads a fracture forms in said marker layer and generates a plurality of crumbs of said first elastomeric composition detectable at an exterior surface of said bearing stack.

10. The bearing of claim 9, wherein said plurality of crumbs are configured to persist on said exterior surface of said bearing stack.

11. The bearing of claim 1, wherein said first elastomeric composition includes a dye.

12. The bearing of claim 11, wherein said dye is not soluble in said first elastomeric composition.

13. The bearing of claim 1, wherein said first elastomeric composition is fluorescent.

14. The bearing of claim 3, wherein said bearing provides constrained relative motion between a first member and a second member, wherein upon fatigue of said bearing a fracture extends from an exterior perimeter of said marker layer toward said interior elastomeric region and said interior elastomeric region is configured to be detectable through said fracture when exposed to a stimulus.

15. The bearing of claim 14, wherein said stimulus is selected from the group consisting of an inspection fluid, a visible light wavelength, an ultraviolet wavelength, and combinations thereof.

16. The bearing of claim 15, wherein said inspection fluid is water.

17. A bearing having a fatigue-indication therein, the bearing comprising:
a bearing stack having a first end and a second end with a longitudinal axis defined between said first and second ends, said bearing stack including a plurality of elastomeric layers wherein each elastomeric layer is sandwiched between at least two non-elastomeric shim layers, wherein each elastomeric layer is concentric about the longitudinal axis, wherein at least one elastomeric layer is a marker layer configured to indicate fatigue of said bearing, wherein said marker layer includes a first inner material having a first optical characteristic ingredient and an outer material coplanar with and enveloping said first inner material, said outer material having a second optical characteristic ingredient, wherein said first and second optical characteristic ingredients are different, wherein said first inner material is detectable when said bearing is fatigued.

18. The bearing of 17, wherein said marker layer further includes a second inner material having a third optical characteristic ingredient different from said first and second optical characteristic ingredients, said second inner material coplanar with said first inner material and said outer material, said second inner material surrounded by and proximate to said first inner material, and said second inner material is detectable when said bearing is fatigued.

19. The bearing of claim 18, wherein said bearing is configured to withstand a compressive load in the direction of said longitudinal axis and a shear load nonparallel to said longitudinal axis and said bearing is configured such that upon degradation of said bearing due to said loads a fracture forms in said marker layer and generates a plurality of crumbs of said first inner material, and said plurality of crumbs detectable at an exterior surface of said bearing stack.

20. The bearing of claim 18, wherein said bearing is configured to withstand a compressive load in the direction of said longitudinal axis and a shear load nonparallel to said longitudinal axis and said bearing is configured such that upon degradation of said bearing due to said loads a fracture forms in said marker layer and generates a plurality of crumbs of said second inner material, and said plurality of crumbs of said second inner material is detectable at an exterior surface of said bearing stack.

21. The bearing of claim 18, wherein said first and second inner materials and outer material of said marker layer have a combined radius of (r) and said outer material region extends outward from the perimeter of said first inner material region a distance (d), wherein (d) is in the range from 0.01 r to 0.5 r.

22. The bearing of claim 17, wherein said bearing stack includes two or more marker layers positioned within said bearing stack at two or more different predetermined layers for indicating fatigue of said bearing.

23. The bearing of claim 17, wherein said bearing is configured to withstand a compressive load in the direction of said longitudinal axis and a shear load nonparallel to said longitudinal axis and said bearing is configured such that upon degradation of said bearing due to said loads a fracture forms in said marker layer and generates a plurality of crumbs of said first inner material, and said plurality of crumbs are detectable at an exterior surface of said bearing stack.

24. The bearing of claim 17, wherein said first inner material and outer material of said marker layer have a combined radius of (r) and said outer material region extends outward from the perimeter of said first inner material region a distance (d), wherein (d) is in the range from 0.01 r to 0.5 r.

25. The bearing of claim 17, wherein said bearing is configured to withstand a compressive load in the direction of said longitudinal axis and a shear load nonparallel to said longitudinal axis and said bearing is configured such that upon degradation of said bearing due to said loads a fracture forms in said marker layer, and wherein said first inner material is configured to be detectable through said fracture when exposed to a stimulus.

26. The bearing of claim 25, wherein said stimulus is selected from the group consisting of, an inspection fluid, a visible light wavelength, an ultraviolet wavelength, and combinations thereof.

* * * * *